United States Patent
Minagawa

(10) Patent No.: US 8,630,013 B2
(45) Date of Patent: Jan. 14, 2014

(54) PRINTING CONTROL APPARATUS AND METHOD FOR CONTINUOUSLY PRINTING A PLURALITY OF JOBS

(71) Applicant: Canon Kabushiki Kaisha, Tokyo (JP)

(72) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/856,335

(22) Filed: Apr. 3, 2013

(65) Prior Publication Data

US 2013/0222853 A1    Aug. 29, 2013

Related U.S. Application Data

(63) Continuation of application No. 12/621,223, filed on Nov. 18, 2009, now Pat. No. 8,531,721.

(30) Foreign Application Priority Data

Nov. 20, 2008  (JP) ................................. 2008-296701

(51) Int. Cl.
*G06K 15/00*    (2006.01)
(52) U.S. Cl.
USPC ........................................................ 358/1.16

(58) Field of Classification Search
None
See application file for complete search history.

(56) References Cited

U.S. PATENT DOCUMENTS

| | | | | |
|---|---|---|---|---|
| 2001/0038463 A1* | 11/2001 | Ishikawa | ....................... | 358/1.16 |
| 2001/0055123 A1* | 12/2001 | Ryan et al. | .................... | 358/1.12 |
| 2004/0090644 A1* | 5/2004 | Nishikawa | .................... | 358/1.13 |

* cited by examiner

*Primary Examiner* — Jeremiah Bryar
(74) *Attorney, Agent, or Firm* — Canon U.S.A., Inc. IP Division

(57) ABSTRACT

An apparatus allocates a value of page attribute to each page included in a job according to a job attribute set to the job in an intermediate code format that corresponds to data to be printed generated by an application. If a combining instruction is issued to combine a plurality of jobs whose specific job attributes in which only one attribute value can be allocated to one job are allocated different attribute values, the apparatus processes the intermediate code format data so that printing is performed according to the allocated page attribute values. The apparatus then generates a combined job and transmits the generated combined job as print data to the printing apparatus.

9 Claims, 35 Drawing Sheets

FIG.15

Xxxxx PageComposer – Xxxxx iR C2880/C3380 LIPS

FILE(F) EDIT(E) MOVE(M) HELP(H)

| COLLECTIVE PRINTING | COLLECTIVE PRINTING AND STAPLING | COLLECTIVE SETTING OPTIONS | DELETE |

| DOCUMENT NAME | NUMBER OF PAGES | LAYOUT INFORMATION | COMMENT |
|---|---|---|---|
| TEST PAGE | 1 | 1 PAGE/SHEET (STANDARD) | |
| TEST PAGE | 1 | 1 PAGE/SHEET (STANDARD) | |
| TEST PAGE | 1 | 1 PAGE/SHEET (STANDARD) | |

PRESS F1 KEY FOR HELP.

FIG.18

| CLASSIFICATION OF SETTINGS | EXAMPLE |
|---|---|
| ONE SETTING TO ONE COMBINED JOB | COLOR SETTING, SIMPLEX/DUPLEX SETTING, STAPLE, NUMBER OF COPIES, BINDING, ETC. |
| MORE THAN ONE SETTING ALLOWED TO ONE COMBINED JOB | LAYOUT (Nup), PAGE FRAME, WATERMARK, ETC. |

FIG.21A

| Job1 | COLOR ATTRIBUTE OF JOB | COLOR |
|---|---|---|
| Job2 | COLOR ATTRIBUTE OF JOB | MONO |

FIG.21B

| Job1 | COLOR ATTRIBUTE OF JOB | | COLOR |
|---|---|---|---|
| | COLOR ATTRIBUTE OF PAGE | Page1 | COLOR |
| | | Page2 | COLOR |
| Job2 | COLOR ATTRIBUTE OF JOB | | MONO |
| | COLOR ATTRIBUTE OF PAGE | Page1 | MONO |
| | | Page2 | MONO |

FIG.21C

| COMBINED JOB | COLOR ATTRIBUTE OF JOB | | AUTOCOLOR |
|---|---|---|---|
| | COLOR ATTRIBUTE OF PAGE | Page1 | COLOR |
| | | Page2 | COLOR |
| | | Page3 | MONO |
| | | Page4 | MONO |

FIG.22A

| Job1 | COLOR ATTRIBUTE OF JOB | | COLOR |
|---|---|---|---|
| | COLOR ATTRIBUTE OF PAGE | Page1 | COLOR |
| | | Page2 | MONO |
| Job2 | COLOR ATTRIBUTE OF JOB | | MONO |
| | COLOR ATTRIBUTE OF PAGE | Page1 | MONO |
| | | Page2 | MONO |

FIG.22B

| COMBINED JOB | COLOR ATTRIBUTE OF JOB | | AUTOCOLOR |
|---|---|---|---|
| | COLOR ATTRIBUTE OF PAGE | Page1 | COLOR |
| | | Page2 | MONO |
| | | Page3 | MONO |
| | | Page4 | MONO |

FIG.25A

| Job1 | SIMPLEX/DUPLEX ATTRIBUTE OF JOB | SIMPLEX |
|---|---|---|
| Job2 | SIMPLEX/DUPLEX ATTRIBUTE OF JOB | DUPLEX |

FIG.25B

| Job1 | SIMPLEX/DUPLEX ATTRIBUTE OF JOB | | SIMPLEX |
|---|---|---|---|
| | SIMPLEX/DUPLEX ATTRIBUTE OF PAGE | Page1 | SIMPLEX |
| | | Page2 | SIMPLEX |
| Job2 | SIMPLEX/DUPLEX ATTRIBUTE OF JOB | | DUPLEX |
| | SIMPLEX/DUPLEX ATTRIBUTE OF PAGE | Page1 | DUPLEX |
| | | Page2 | DUPLEX |

FIG.25C

| COMBINED JOB | SIMPLEX/DUPLEX ATTRIBUTE OF JOB | | AUTODUPLEX |
|---|---|---|---|
| | SIMPLEX/DUPLEX ATTRIBUTE OF PAGE | Page1 | SIMPLEX |
| | | Page2 | SIMPLEX |
| | | Page3 | DUPLEX |
| | | Page4 | DUPLEX |

FIG.26

| CONDITION NUMBER | DETERMINATION CONDITION | | | OUTPUT SETTING |
|---|---|---|---|---|
| | APPLICATION NAME | JOB NAME | KEYWORD | |
| #1 | SPREADSHEET | | | MONOCHROME |
| #2 | BROWSE | | | COLOR |
| #3 | DOCUMENT | | | MONOCHROME |
| #4 | DOCUMENT | | ESTIMATE | COLOR |
| #5 | DOCUMENT | Spec Document | | COLOR |

FIG.27

[PrinterModelName]
Driver01="LBP5910"

：

AppName03="Doc.exe"
JobName03=""
KeyWord03=""
ColorMode03="MONO"

AppName04="Doc.exe"
JobName04=""
KeyWord04="ESTIMATE"
ColorMode04="COLOR"

AppName05="Doc.exe"
JobName05="Spec Document"
KeyWord05=""
ColorMode05="COLOR"
　：

PRINTING CONTROL APPARATUS AND METHOD FOR CONTINUOUSLY PRINTING A PLURALITY OF JOBS

CROSS-REFERENCE TO RELATED APPLICATION

This application is a Continuation of U.S. application Ser. No. 12/621,223, filed Nov. 18, 2009, which claims priority from Japanese Patent Application No. 2008-296701 filed Nov. 20, 2008, which is hereby incorporated by reference herein in its entirety.

BACKGROUND OF THE INVENTION

1. Field of the Invention

The present invention relates to a control method for continuously printing a plurality of jobs without being interrupted by printing from another job.

2. Description of the Related Art

When a plurality of jobs is printed with a shared printer, group printing can reduce or prevent another user's job from slipping into the plurality of jobs, which causes a mix-up of printouts leading to the burdensome sorting of such printouts.

Japanese Patent Application Laid-Open No. 2006-192804 discusses setting, to the print job which is to be group-printed, a unique group identifier, a number of jobs in the group, and a value indicating an order of a job within the group. The printer stores the print data inside the printer until all the jobs in the group are received and then collectively prints the jobs to prevent mixing of jobs other than those in the group. Further, the printer prints in the order designated in the group even when the order of receiving the jobs has changed.

Further, Japanese Patent Application Laid-Open No. 2005-149159 discusses a technique in which, when the same user issues a print request within a set period of time, a print job requested by a different user is suspended.

Furthermore, Japanese Patent Application Laid-Open No. 2005-202723 discusses once accumulating a plurality of print jobs in a print server and performing pull printing by the user holding a card in front of the printer. As a result, the jobs can be collectively printed with an arbitrary printer even if the user does not designate a print output destination. Further, priority is given to the processing of a plurality of jobs during pull printing to prevent mixing with other jobs.

In the above-described conventional techniques, it may be necessary on the printer side to identify the group identifier and user information added to the job and to perform a special process such as restricting job interruption based on the identified information. Further, the technique discussed in Japanese Patent Application Laid-Open No. 2005-202723 requires a print server, a card reader, and a card authentication system, so that it becomes expensive to introduce such a system.

In contrast to the above-described techniques, there is a technique which combines a plurality of jobs into one job on the host side. As a result, a plurality of jobs can be continuously printed without interruption even if the printer does not include a special function. For example, Japanese Patent Application Laid-Open No. 2001-134394 discusses once storing print jobs as intermediate files in the host side and combining a plurality of jobs. The combining of the jobs can prevent another unexpected job from mixing into the plurality of jobs.

The techniques discussed in Japanese Patent Application Laid-Open No. 2001-134394 thus does not require special control to be performed on the printer side to continuously print a plurality of jobs desired by the user without being interrupted by another job. Such a technique is useful for the user.

However, there is a print attribute in which only one setting value can be specified to one print job due to a limitation of the conventional printing system. Therefore, the setting value of the print attribute in each job may be changed when the jobs are combined using the above-described technique.

SUMMARY OF THE INVENTION

According to an aspect of the present invention, an apparatus includes a storing unit configured to store a job which is converted to an intermediate code format based on data to be printed generated by an application, in association with a job attribute to be set to the job, an allocation unit configured to allocate a value of page attribute to each page included in the job according to the set job attribute, an instruction unit configured to issue an instruction to combine a plurality of jobs stored in the storing unit into one combined job, a generation unit configured to generate, when the instruction unit issues the instruction to combine into one job a plurality of jobs whose specific job attributes in which only one attribute value can be allocated to one job are allocated different attribute values, a combined job so that printing is performed according to the allocated value of page attribute, and a transmission unit configured to transmit the generated combined job as print data to a printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates the UI of the spool file manager.

FIG. 18 illustrates an example of classifying attributes that are used to be uniformed and attributes that are not used to be uniformed when combining the jobs.

FIGS. 21A, 21B, and 21C illustrate examples of attribute files that describe the color attributes of jobs.

FIGS. 22A and 22B illustrate examples of attribute files that describe the color attributes of jobs (including the result of automatic color determination).

FIGS. 25A, 25B, and 25C illustrate examples of attribute files that describe the simplex and the duplex print attributes of the jobs.

FIG. 26 illustrates an example of a list of color attribute determination conditions.

FIG. 27 illustrates an example of a color attribute determination conditions file.

DESCRIPTION OF THE EMBODIMENTS

Various exemplary embodiments, features, and aspects of the invention will be described in detail below with reference to the drawings.

Figure 1:
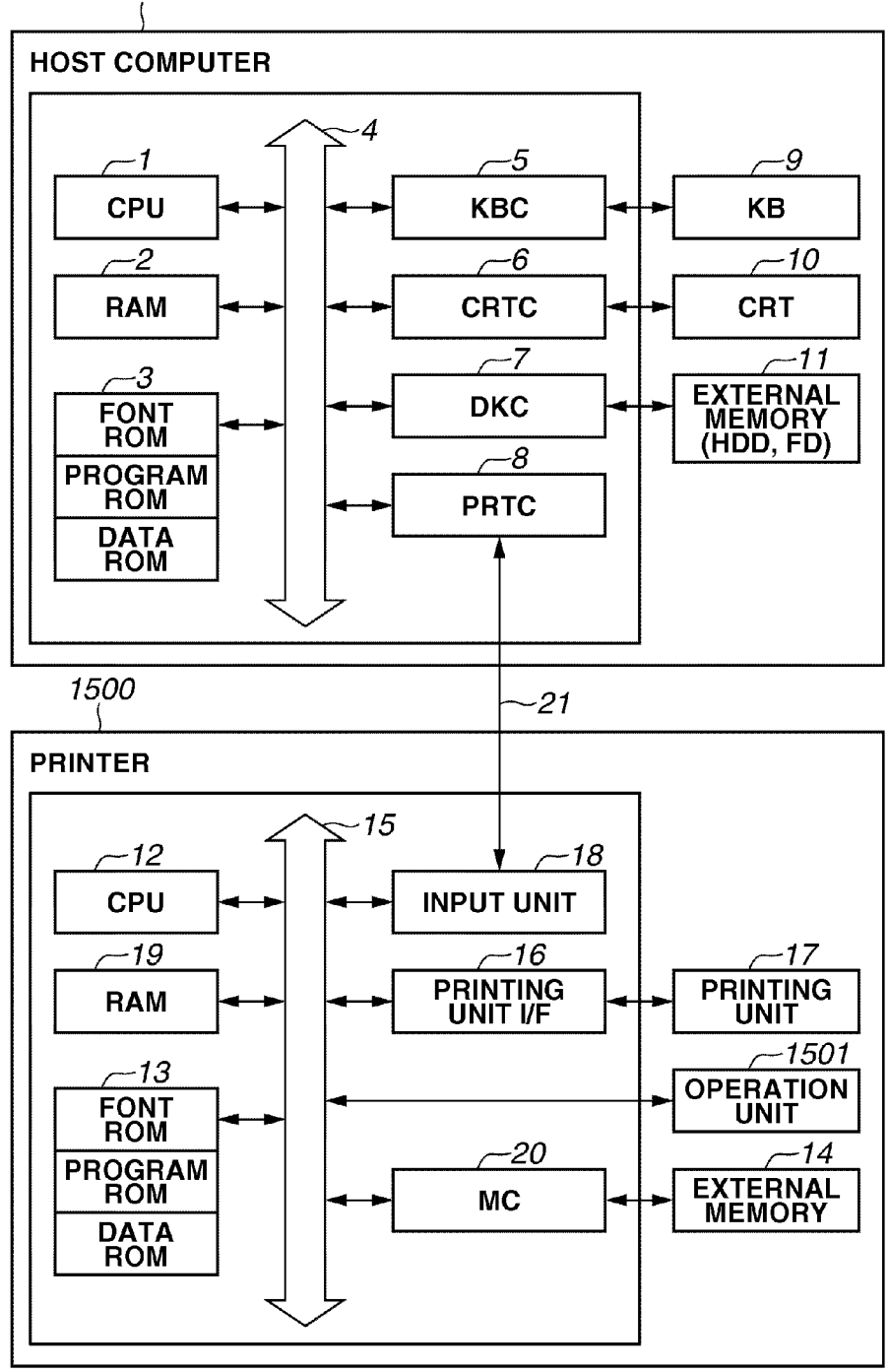
FIG. 1 is a block diagram illustrating a configuration of an image processing apparatus according to an exemplary embodiment of the present invention.

FIG. 1 is a block diagram illustrating the configurations of a host computer and a printer (i.e., image processing apparatus) included in a printing system according to the exemplary embodiment of the present invention.

Referring to FIG. 1, a host computer 3000 is a printing control apparatus. The host computer 3000 includes a central processing unit (CPU) 1, which realizes document and image processing based on a document processing program stored in a programmable read-only memory (ROM) in a ROM 3 (including a font ROM, a program ROM, and a data ROM) or an external memory 11 (i.e., HDD, FD, etc.). Further, the CPU 1 integrally controls each of the components connected to a system bus 4.

The program ROM in the ROM 3 or the external memory 11 stores an operating system (OS), which is a control program of the CPU 1. A font ROM in the ROM 3 or the external memory 11 stores font data used in performing the above-described document processing, and a data ROM or the external memory 11 stores information used in performing the various processes. A random access memory (RAM) 2 functions as a main memory and a work area for the CPU 1.

A keyboard controller (KBC) 5 controls key inputs from a keyboard 9 or a pointing device (not illustrated). A cathode ray tube controller (CRTC) 6 controls display of a CRT display (CRT) 10. A disk controller (DKC) 7 controls an access to the external memory 11 such as a hard disk drive (HDD) and a floppy disk (FD) that stores boot program, various applications, font data, and printer control command generation program (hereinafter referred to as a printer driver).

A printer controller (PRTC) 8 is connected to a printer 1500 via a bi-directional interface 21 and executes a communication control process with the printer 1500.

The CPU 1 executes a rasterizing process of an outline font into a display information memory set on the RAM 2 and thus enables What You See Is What You Get (WYSIWYG) on the CRT 110 to be realized. Further, the CPU 1 opens various registered windows based on commands instructed by the user using a mouse cursor (not illustrated) on the CRT 10 and executes various data processes. More specifically, when the user executes printing, the user can open a print setting window and can specify a print request to the printer driver, including the printer setting and the selection of a print mode.

The printer 1500 includes a CPU 12 that controls each of the components in the printer 1500. The CPU 12 operates and realizes various processes based on the control program stored in the program ROM in a ROM 13 or the control program stored in an external memory 14.

The CPU 12 outputs an image signal as output information to a printing unit (printer engine) 17 connected to a system bus 15 via a printing unit interface (I/F) 16. The program ROM in the ROM 13 stores the control program of the CPU 12. The ROM 13 includes a font ROM, a program ROM, and a data ROM. The font ROM of the ROM 13 stores the font data used when generating the output information. The data ROM stores information used in performing various processes, such as printing.

The CPU 12 can communicate with the host computer 3000 via an input unit 18 and can notify the host computer 3000 of information in the printer. A RAM 19 functions as a main memory and work area for the CPU 12, and its memory capacity can be expanded using an optional RAM which is connected to a memory expansion port (not illustrated). The RAM 19 is used as an output information rasterizing area, an environmental data storing area, and a non-volatile (NV) RAM. A memory controller (MC) 20 controls the access to the external memory 14 such as a HDD or an integrated circuit (IC) card. The external memory 14 is connected as an option and stores font data, an emulation program, and form data.

The input unit 18 includes switches for operating on an operation panel and a light emitting diode (LED) display device.

The printer 1500 can include a plurality of external memories 14. The printer 1500 can thus be configured by connecting a plurality of external memories that stores an option card and programs for interpreting a page description language of a different language, in addition to an embedded font. Further, the printer can include an NVRAM (not illustrated) and store printer mode setting information received from an operation panel 1501.

Figure 2:
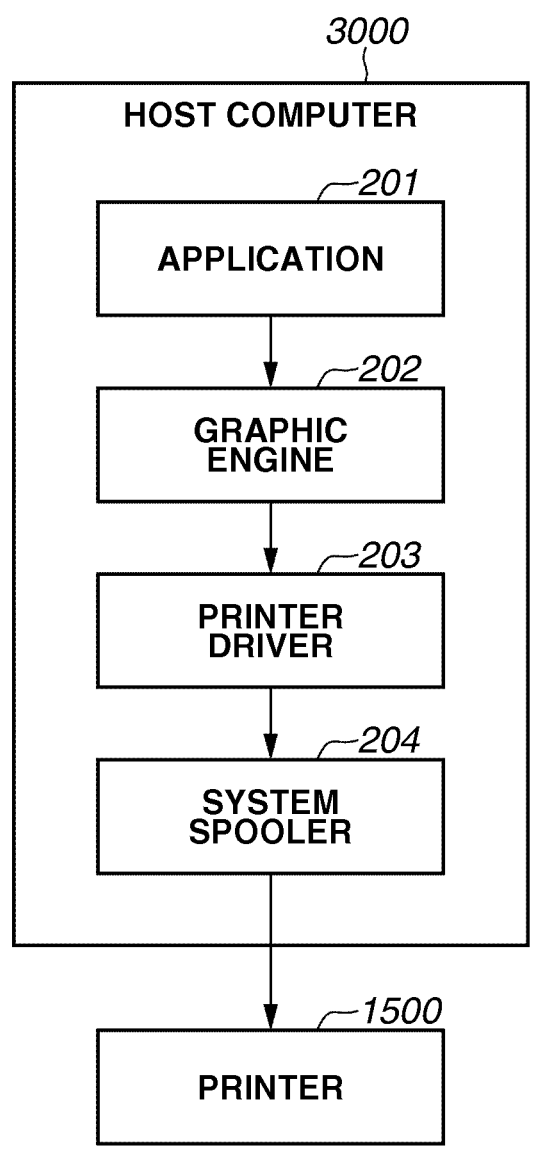
FIG. 2 illustrates a print path for performing normal printing.

FIG. 2 illustrates a configuration of a module which performs a typical printing process in the host computer connected to the printer via a predetermined line (such as a local area network (LAN)).

An application 201, a graphic engine 202, a printer driver 203, and a system spooler 204 exist as files stored in the external memory 11. Such files are loaded to the RAM 2 by the OS or a module using the module and are executed. Further, the application 201 and the printer driver 203 can be added to the HDD of the external memory 11 via the FD of the external memory 11, a compact disc (CD) ROM (not illustrated), or a network (not illustrated).

The application 201 is loaded into the RAM 2 and executed. When the application 201 performs printing on the printer 1500, the application 201 uses the graphic engine 202 similarly loaded into the RAM 2 to output (draw) the result.

The graphic engine 202 loads the printer driver 203 provided for each printing apparatus from the external memory 11 to the RAM 2 and sets an output from the application 201 to the printer driver 203. The graphic engine 202 then coverts a graphic device interface (GDI) function received from the application 201 into a device driver interface (DDI) function and outputs the DDI function to the printer driver 203. The series of data received by the printer driver via the DDI is referred to as a print job, or simply a job. One print job is generated for one print request.

The printer driver 203 converts the DDI function received from the graphic engine 202 to a control command that is recognizable by the printer, such as a page description language (PDL). A control command set generated form a print request will be referred to as a print job. The generated print job is output as print data to the printer 1500 via the system spooler 204 loaded onto the RAM 2 by the OS and via the interface 21.

The present exemplary embodiment includes a printing environment formed by the printer 1500 and the host computer 3000 as illustrated in FIG. 2. Further, the present exemplary environment once spools the print data from the application as intermediate code data as illustrated in FIG. 3.

Figure 3:
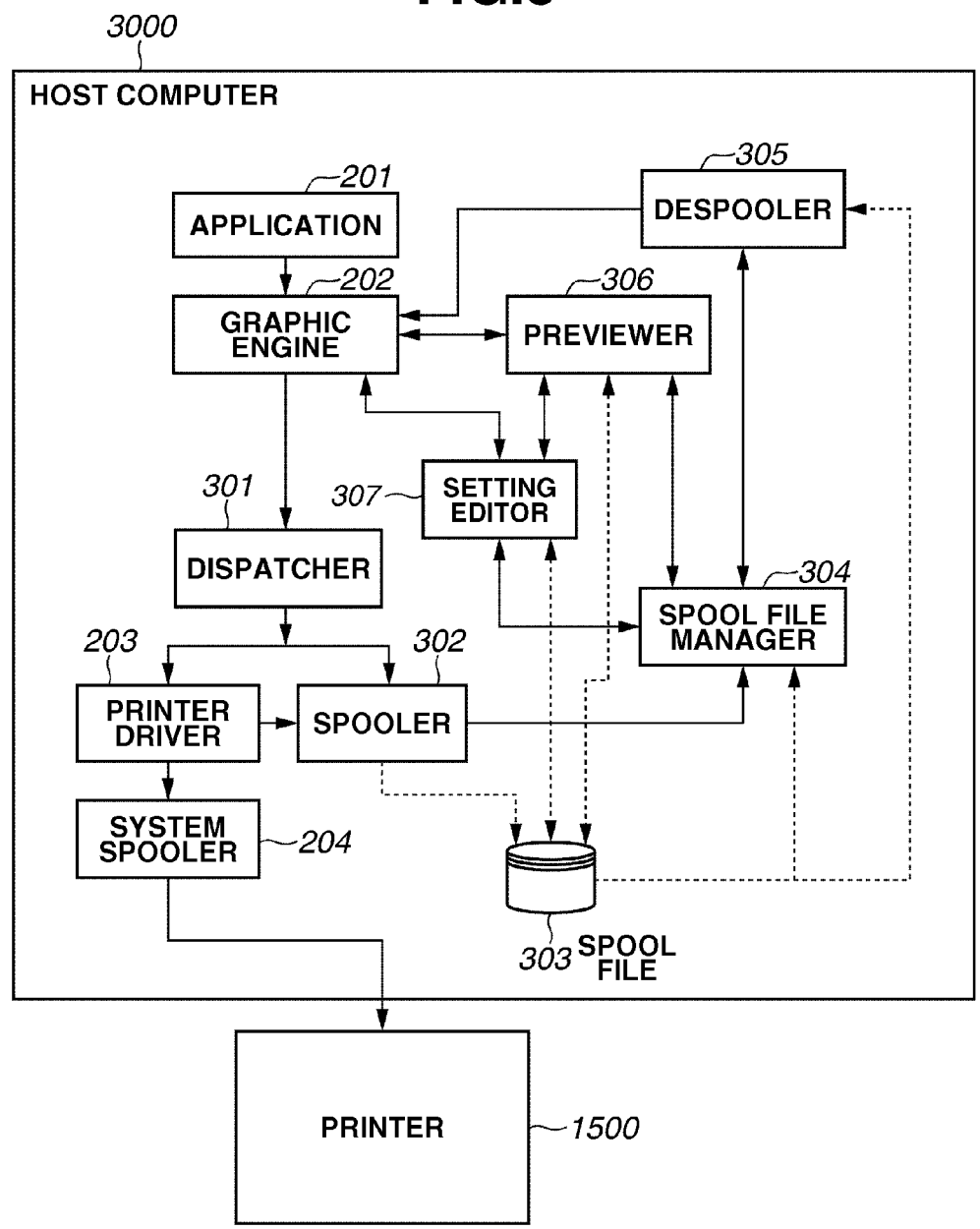
FIG. 3 is a print path for performing extended printing according to the exemplary embodiment of the present invention.

FIG. 3 illustrates an extended module configuration of the computer 3000 illustrated in FIG. 2. More specifically, when the graphic engine 202 issues a print command to the printer driver 203, the host computer 3000 once generates a spool file 303 configured of the intermediate codes. A series of intermediate codes converted from one print job will be referred to as an intermediate job.

Referring to FIG. 3, the intermediate job can be processed, rearranged, and combined with each other as the spool file 303. If the user is to set print attributes to the print data, the user normally sets the print attributes from the window provided by the printer driver 203. The printer driver 203 then stores the contents of the settings in the RAM 2 or the external memory 11.

In the extended control method illustrated in FIG. 3, a dispatcher 301 receives the DDI function which is the print command from the graphic engine 202. If the print command received by the dispatcher 301 is based on the print command issued by the application 201 (i.e., the GDI function), the dispatcher 301 activates a spooler 302 and transmits the print command (i.e., the DDI function) to the spooler 302.

The spooler 302 then analyzes the received print command, converts the print command into the intermediate code for each page, and outputs the result to the spool file 303. A spool file configured of the intermediate codes, which are stored for each page, will be referred to as a page drawing file. Further, the spooler 302 acquires from the printer driver 203 the print attributes (e.g., N-up, duplex printing, stapling, and color/monochrome settings) set to the print data and stores the print attributes as a print attribute file for each job in the spool file 303. The print attribute for each job will be referred to as a job attribute and is distinguished from a page attribute to be described below.

The spool file 303 which is generated as a file in the external memory 11 can also be generated in the RAM 2.

The spooler 302 further loads into the RAM 2 a spool file manager 304 stored in the external memory 11 and notifies the spool file manager 304 of the generation of the spool file 303. The spool file manager 304 then generates a job management list in the RAM 2 and manages the spool file 303 (intermediate job) based on the received notification.

When printing is performed from the spool file manager 304 based on an instruction from the user, the spool file manager 304 instructs a despooler 305 to print the page drawing file of the intermediate code written in the spool file 303.

Upon receiving the request, the despooler 305 processes the page drawing file of the intermediate code included in the spool file 303 according to the print attribute. The despooler 305 then regenerates the GDI function and again outputs the GDI function via the graphic engine 202.

If the print command (i.e., DDI function) received by the dispatcher 301 from the graphic engine 202 is based on the print command (i.e., GDI function) received from the despooler 305, the dispatcher 301 transmits the print command (DDI function) to the printer driver 203.

The printer driver 203 then generates a printer control command written in the page description language using the DDI function acquired from the graphic engine 202. The printer driver 203 thus outputs the generated printer control command to the printer 1500 via the system spooler 204.

The spool file manager 304 can further instruct combining the intermediate jobs and printing the combined job. In such a case, since there are print attributes in which only one attribute value can be set to one job, there are attributes whose setting values can be inherited from the original job and those that are used to be uniformed to one attribute value in the combined job.

FIG. 18 illustrates examples of print attributes that are used to be uniformed when the jobs are combined, and in which different setting values can be set (can be mixed) within the job.

Returning to FIG. 3, in addition to the above-described extended configuration, the host computer 3000 further includes a previewer 306 that previews the spool file and a setting editor 307 that allows the setting to be changed.

Figure 4:
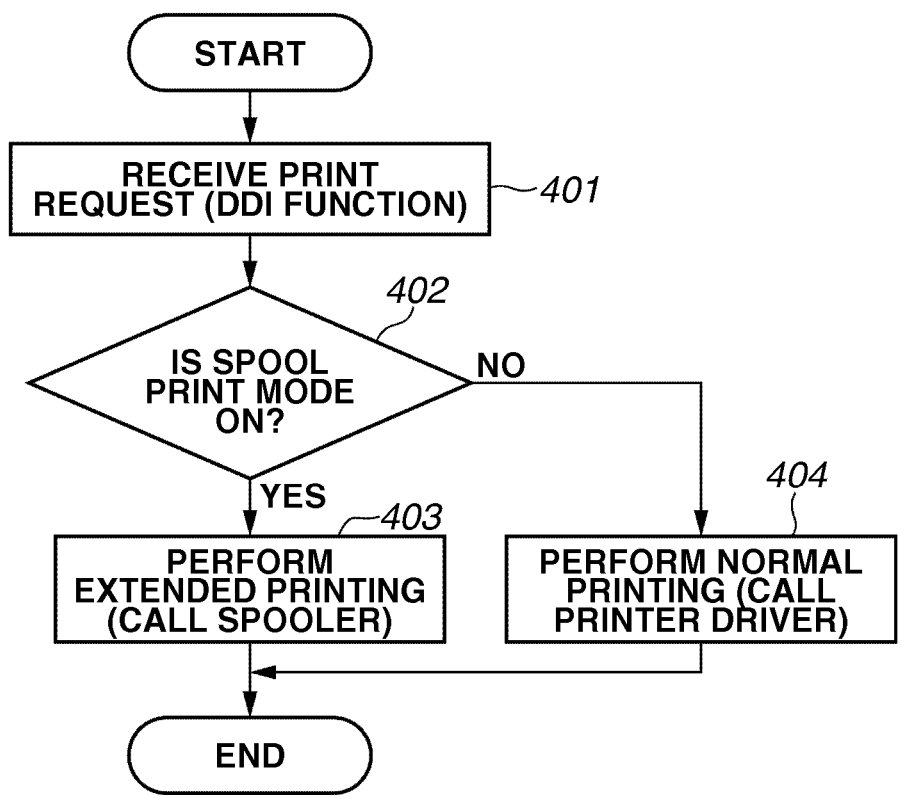
FIG. 4 is a flowchart illustrating a process performed according to a spool print mode.

FIG. 4 is a flowchart illustrating a portion of an operation of the dispatcher 301 according to a spool print mode when printing is performed from the application in the host computer. The spool print mode is a control mode for performing extended printing illustrated in FIG. 3.

In step 401, the dispatcher 301 receives the print request (DDI function). In step 402, the dispatcher 301 determines whether the spool print mode is on. If the spool print mode is on (YES in step 402), the process proceeds to step 403. In step 403 (i.e., perform extended printing (call spooler)), the dispatcher 301 activates the spooler 302 and transmits the DDI function to the spooler 302. On the other hand, if the spool print mode is off (NO in step 402), the process proceeds to step 404. In step 404 (i.e., perform normal printing (call printer driver)), the dispatcher 301 directly transmits the DDI function to the printer driver 203.

Figure 14:
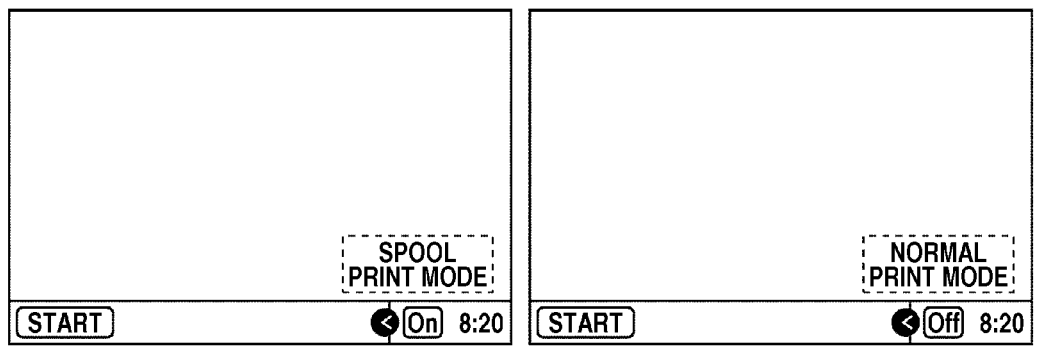
FIG. 14 illustrates an example of a user interface (UI) used to switch the spool print mode.

FIG. 14 illustrates an example of the UI used in switching the spool print mode on and off. Referring to FIG. 14, the user can switch on and off the spool print mode by pressing a button on a task tray. The setting information is stored in a memory such as a registry, and in step 402 illustrated in FIG. 4, the dispatcher 301 determines the spool print mode by referring to the information.

FIG. 15 illustrates an example of the UI of the spool file manager 304. Referring to FIG. 15, three jobs received from the application are spooled, and the list is displayed on the screen of the UI. The user can instruct collective printing (job combining) and the like via the UI.

Figure 5:
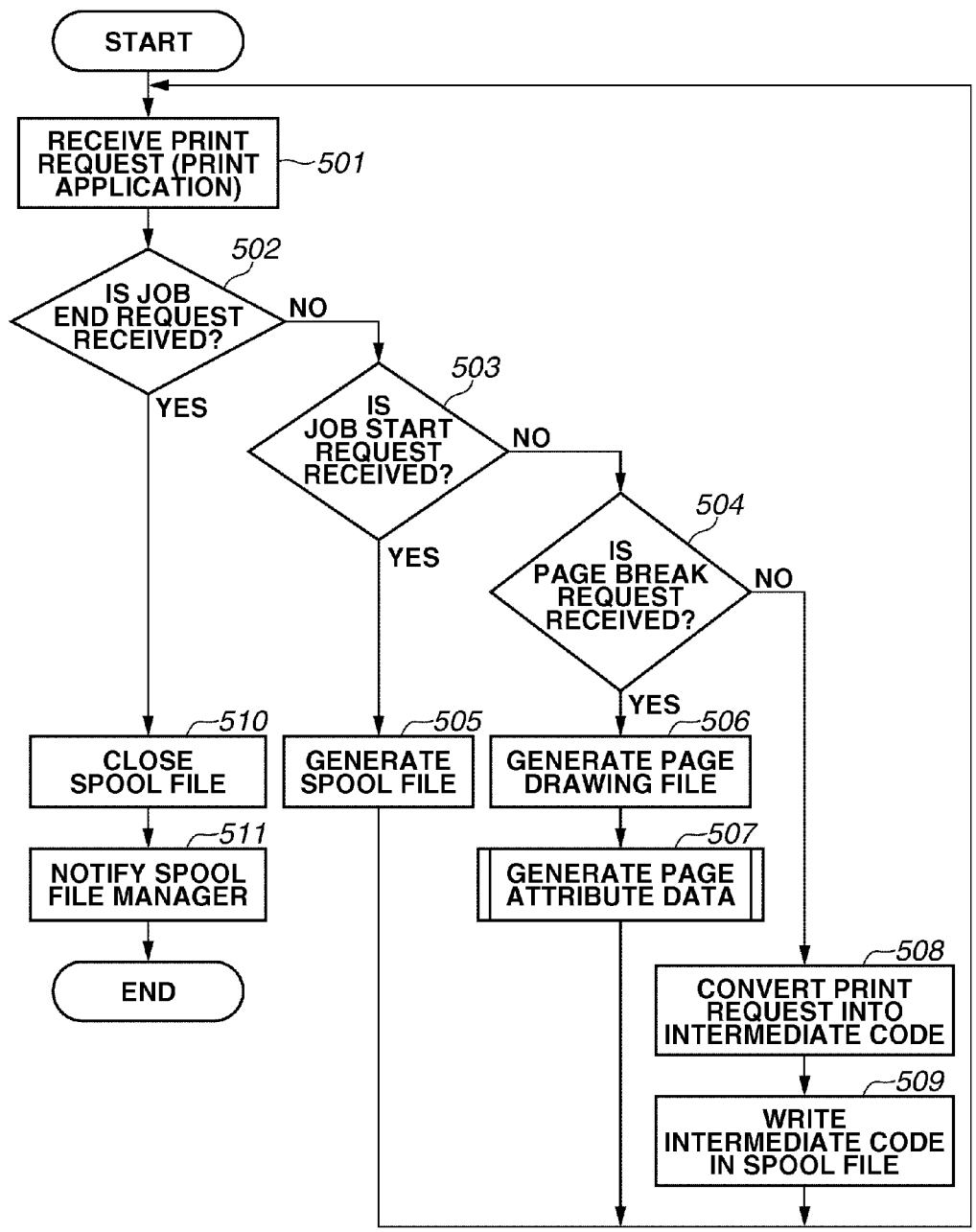
FIG. 5 is a flowchart illustrating a process performed by a spooler.

FIG. 5 is a flowchart illustrating a process of generating the spool file when the spooler 302 receives the print request (DDI function).

In step 501, the spooler 302 receives the print request from the application 201 via the graphic engine 202. The print request includes various types of information about the data to be printed, such as start and end of the job, control command such as page break, and drawing data.

In step 502 to step 504, the spooler 302 determines whether the request received in step 501 is a job end command, a job start command, or a page break command.

If the spooler 302 determines that the request is not a job end command in step 502 (NO in step 502) and is a job start command in step 503 (YES in step 503), the process proceeds to step 505. In step 505, the spooler 302 generates the spool file 303 and keeps an area for storing job information. The spooler 302 thus stores in the attribute file the job attribute data acquired from the printer driver 203.

If the spooler 302 determines that the request is not a job command in step 503 (NO in step 503) and is the page break command in step 504 (YES in step 504), the process proceeds to step 506. In step 506, the spooler 302 generates a page drawing file of the next page. Since the intermediate data is generated for each page, the drawing file is also generated for each page. In step 507, the spooler 302 generates the page attribute data that includes the print attributes for each page and adds the generated page attribute data to the attribute file by associating the page attribute data with the appropriate page.

If the spooler 302 determines that the request is not the page break command in step 504 (NO in step 504), the print request is determined to be none of the control commands and is thus determined to be the drawing data. In step 508, the spooler 302 converts the DDI function of the print request (i.e., drawing data) to the intermediate code for storing in the spool file 303. In step 509, the spooler 302 writes the intermediate code in the spool file 303.

The spooler 302 then performs the series of processes from step 501 to step 509 until the spooler 302 receives the job end command (i.e., until the received request is determined as the job end command in step 502).

If the spooler 302 determines that the request is the job end command in step 502 (YES in step 502), the process proceeds to step 510. In step 510, the spooler 302 then closes the spool file, and in step 511, the spooler 302 notifies the spool file manager 304 that spooling has been completed. The process then ends.

Figure 6:
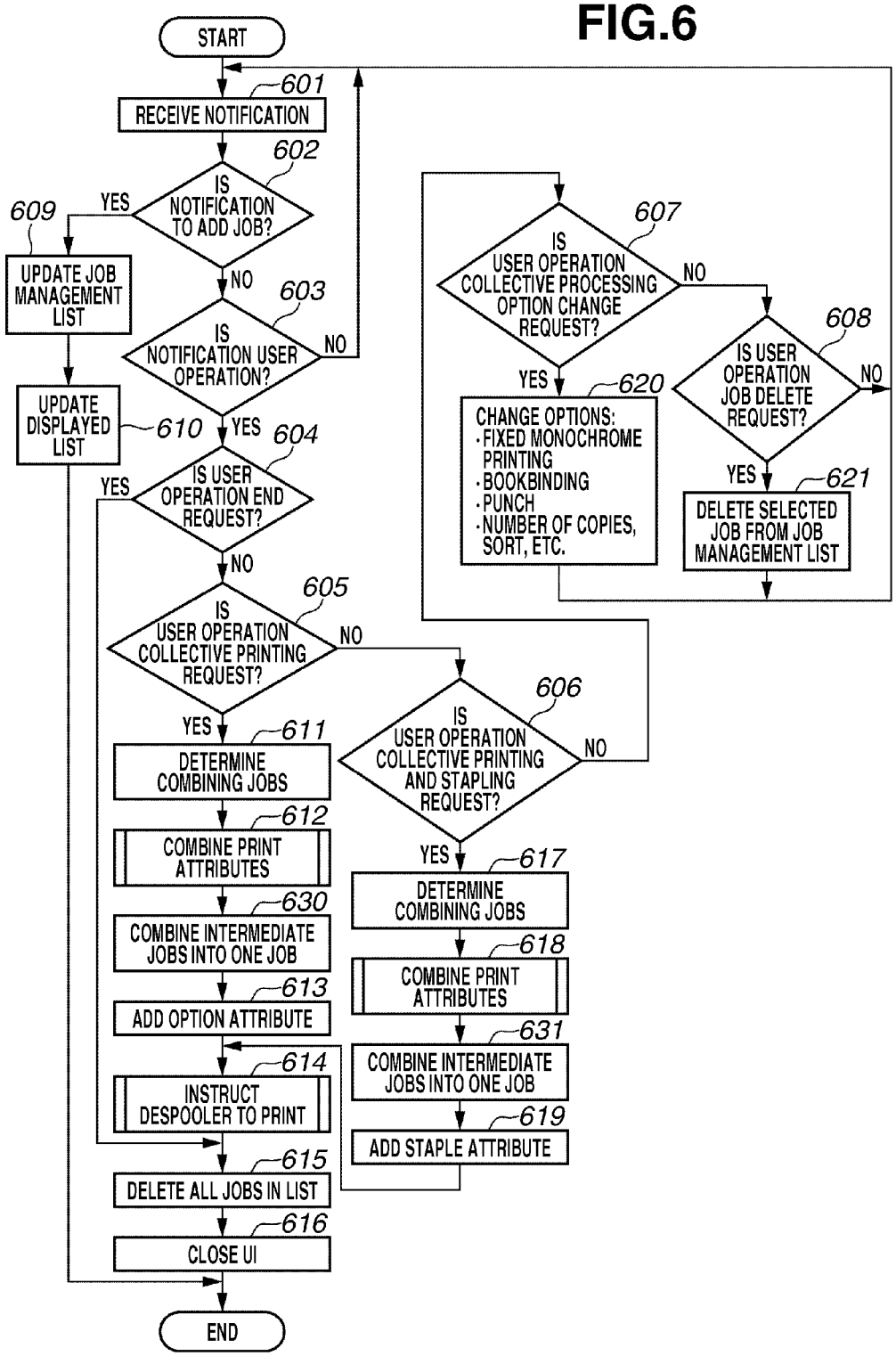
FIG. 6 is a flowchart illustrating a process performed by a spool file manager.

FIG. 6 is a flowchart illustrating in detail a job management process and printing control based on the user instruction performed by the spool file manager 304. The spool file manager 304 manages the spool file 303 spooled by the spooler 302. The spool file manager 304 further displays the list of the files on the UI and prints and deletes the intermediate job according to the user instruction.

In step 601, the spool file manager 304 receives a notification. In step 602, the spool file manager 304 determines whether the received notification is a job addition notification from the spooler 302. Further, in step 603, the spool file manager 304 determines whether the received notification is a user operation.

Figure 16:
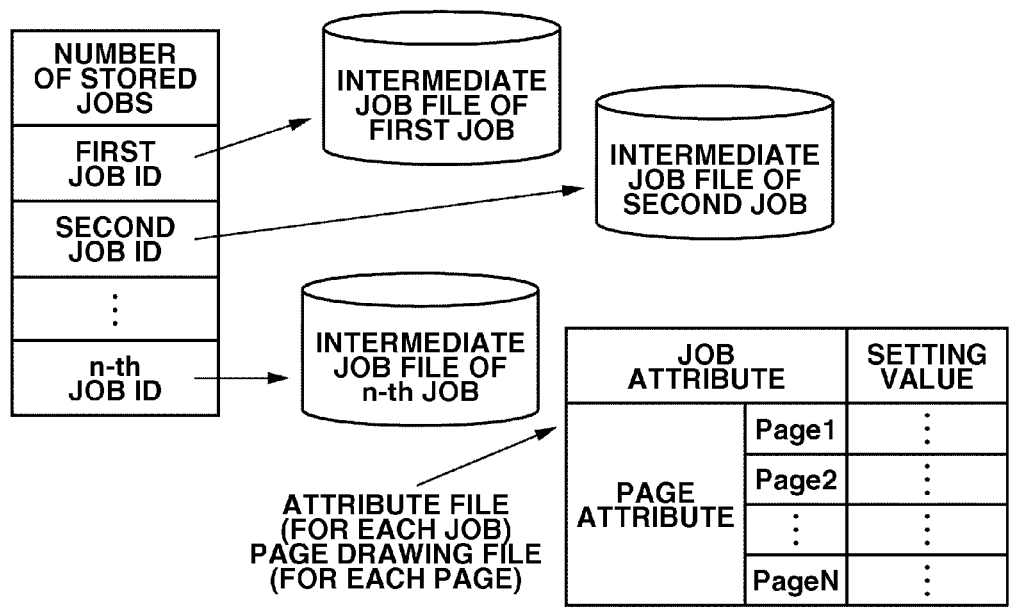
FIG. 16 illustrates an example of a data structure which manages the spool file.

If the spool file manager 304 determines that the notification is a job addition notification in step 602 (YES in step 602), the process proceeds to step 609. In step 609 (update job management list), the spool file manager 304 adds the new job to a job management list such as illustrated in FIG. 16. If the spool manager 304 determines that the notification is not a job addition notification in step 602 (NO in step 602), the process proceeds to step 603.

Referring to FIG. 16, the job management list illustrated in the left side of the figure stores the number of jobs being stored and job identification (ID). Each of the job IDs is associated with an intermediate job file (i.e., spool file 303). The intermediate job file includes one attribute file for each job and one page drawing file for each page. The attribute file includes the job attribute and the page attribute of each page.

In step 610 (update displayed list), the spool file manager 304 updates the screen displayed on the UI (illustrated in FIG. 15). The addition of the intermediate job then ends. FIG. 15 illustrates an example of the UI, which displays a list of spooled jobs. The UI is updated when a job is added.

On the other hand, if the spool file manager 304 determines that the notification is a user operation in step 603 (YES in step 603), the process proceeds to step 604. Otherwise (NO in step 603), the process returns to step 601. In each of the steps from step 604 to step 608, the spool file manager 304 determines whether the user operation is a job end request, a collective printing request, a collective printing and stapling request, a collective processing option change request, or a job delete request.

If the spool file manager 304 determines that the user operation is not a job end request in step 604 (NO in step 604) and determines that the user operation is a collective printing request in step 605 (YES in step 605), the user has pressed a "collective printing" button illustrated in FIG. 15. The process then proceeds to step 611. If the spool file manager 304 determines that the user operation is a job end request in step 604 (YES in step 604), the process is terminated. In step 611, the spool file manager 304 determines whether all of the currently spooled intermediate job files can be combined by analyzing the print attributes. If all of the files can be combined, the process proceeds to step 612, in which the spool file manager 304 uniforms the job attributes of each of the intermediate job files into one job attribute and combines the page attributes. In step 630 (combine intermediate jobs into one job), the spool file manager 304 then generates one combined job and adds the generated job to the spool file 303. In step 613 (add option attribute), the spool file manager 304 applies, if the collective processing option is specified in step 620, the specified setting, and the process then proceeds to step 614.

If the spool file manager 304 determines in step 604 that the user operation is not the collective printing request (NO in step 604) and determines in step 606 that the user operation is the collective printing and stapling request (YES in step 606), the process proceeds to step 617. The spool file manager 304 then performs processes similar to those in step 611, step 612, and step 630 in step 617, step 618, and step 631. In step 619, the spool file manager 304 then sets a staple attribute "on". Then, the process proceeds to step 614, in which the spool file manager 304 makes a print request to perform stapling on the entire combined job.

More specifically, in step 614, the spool file manager 304 issues the print instruction to the despooler 305. In step 615, the spool file manager 304 then deletes all of the intermediate jobs and combined jobs and clears the job management list. In step 616, the spool file manager 304 closes the UI, and the process then ends.

Figure 17A:
FIGS. 17A and 17B illustrate examples of group printing.

FIG. 17A illustrates an example in which three independent jobs are once spooled and then collectively printed. In the illustrated example, each job is printed according to the respective setting.

Figure 17B:
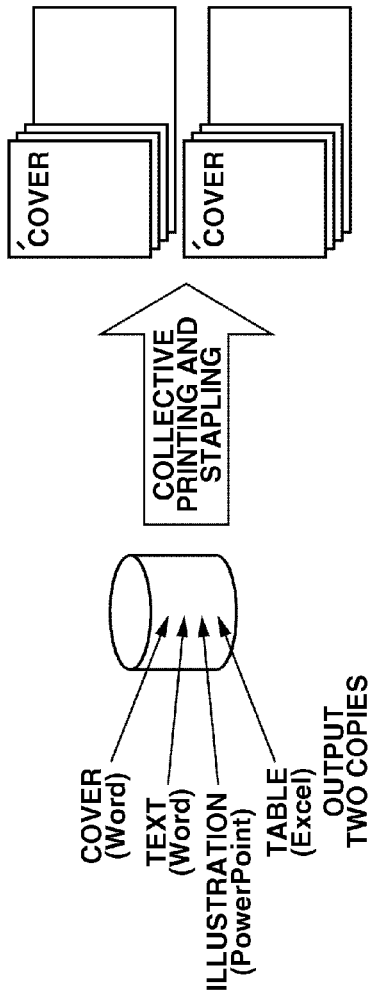

FIG. 17B illustrates an example in which four jobs that are dependent on each other are once spooled, and two copies are printed by performing collective printing and stapling. The jobs that are printed from different applications can thus be collectively stapled. A plurality of copies can also be printed.

If the spool file manager 304 determines in step 606 that the user operation is not the collective printing and stapling request (NO in step 606) and determines in step 607 that the user operation is the collective processing option change request (YES in step 607), the process proceeds to step 620. In step 620, the spool file manager 304 displays a UI (not illustrated) for the user to designate an option attribute that can be applied to the combined job. For example, if the user designates bookbinding, the spool file manager 304 controls to perform a predetermined imposition process and bookbinding printing. The user can also specify settings such as monochrome printing, punching, number of copies, and sorting. The setting specified by the user is added as the job attribute.

The staple setting can be also included in the option attributes in step 620, so that staple printing can be realized by performing collective printing after the determination in step 605. The processes of step 606 and from step 617 to step 619 are performed as an example of performing a series of processes with one request to reduce the number of operational steps. The staple printing can thus be realized by only performing one of the methods.

If the spool file manager 304 determines in step 608 that the user operation is a job delete request (YES in step 608) while the user is selecting one or more intermediate job file on the UI illustrated in FIG. 15, the process proceeds to step 621. In step 621, the spool file manager 304 deletes the selected intermediate jobs from the spooler 302. The spool file manager 304 further deletes the selected intermediate jobs from the job management list.

Figure 7:
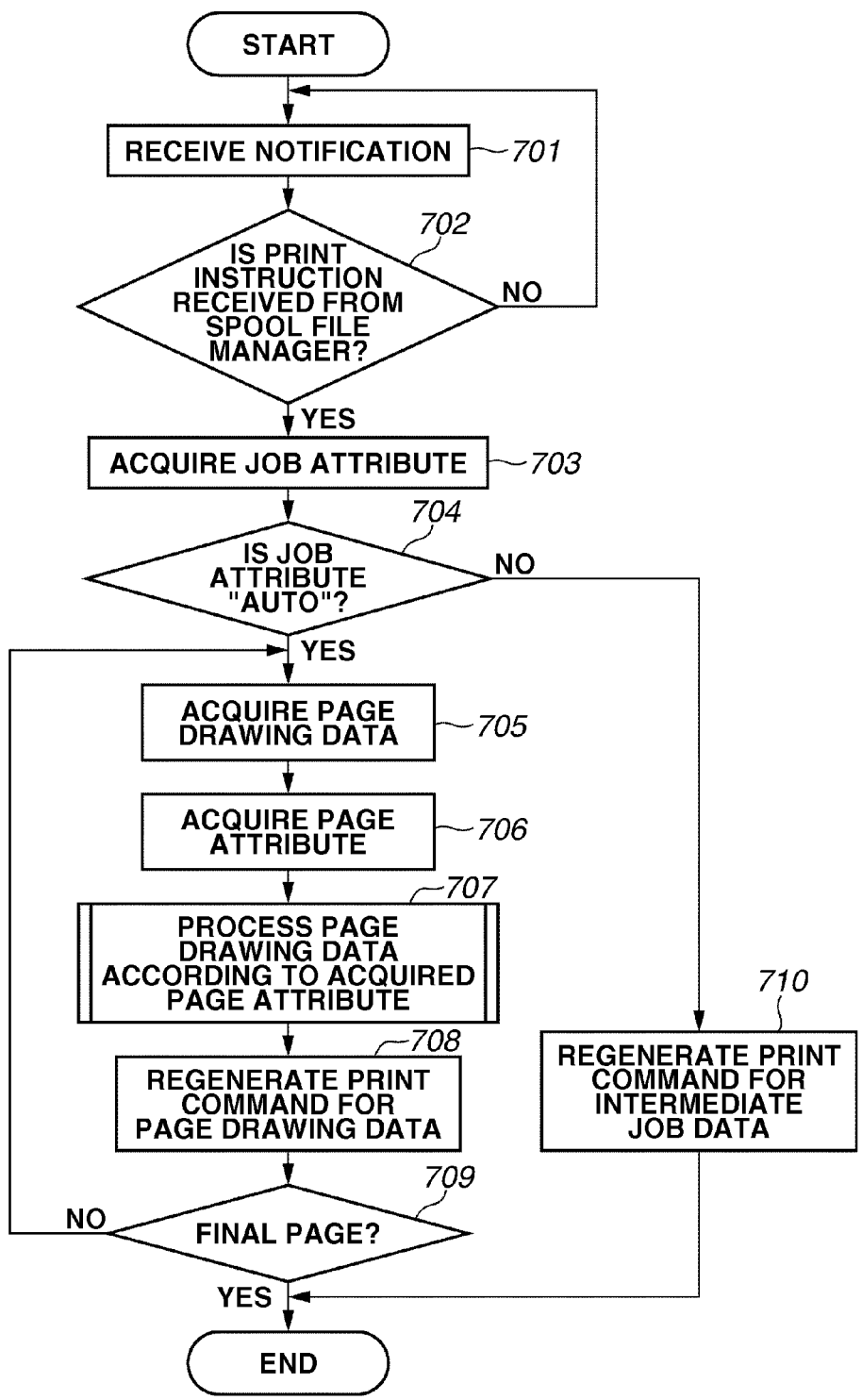
FIG. 7 is a flowchart illustrating a process performed by a despooler.

FIG. 7 is a flowchart illustrating in detail the print data generation process performed by the despooler 305.

The despooler 305 prints the designated intermediate job and the combined job according to the print request from the spool file manager 304. Since different settings may be specified for each of the original intermediate jobs in the combined job, the despooler 305 processes the page drawing data by referring to the job attributes and the page attributes and outputs according to the attributes.

In step 701, the despooler 305 receives a notification. In step 702, the despooler 305 determines whether the notification is a print request from the spool file manager 304. If the despooler 305 determines that the notification is not a print request from the spool file manager 304 (NO in step 702), the despooler 305 performs a different predetermined process according to the notification and waits for the next notification to be input.

On the other hand, if the despooler 305 determines that the notification is a print request from the spool file manager 304 (YES in step 702), the process proceeds to step 703. In step 703, the despooler acquires the job attribute of the job to be printed.

In step 704, the despooler 305 then determines whether the acquired job attribute is an AUTO attribute (such as AUTO-COLR or AUTODUPLEX). If the despooler 305 determines that the job attribute is an AUTO attribute (YES in step 704), the despooler 305 performs the processes of step 705 to step 709 for each page included in the job.

More specifically, the despooler 305 acquires the page drawing data of the page in step 705 and the page attribute in step 706. In step 707, the despooler 305 performs page processing according to the acquired page attribute. In step 708, the despooler 305 regenerates the print command to print the page drawing data of the page.

The determination process in step 704 and the processes of step 705 to step 710 are performed for each attribute (not illustrated). The series of processes will be described in detail below using examples in which color printing and monochrome printing jobs are mixed, and in which simplex printing and duplex printing jobs are mixed.

The despooler 305 then repeats the processes of step 705 to step 708 for each page. In other words, if the despooler 305 determines in step 709 that it is not processing the last page (NO in step 709), the process returns to step 705. When the despooler 305 determines in step 709 that the processing of the last page has ended, the process ends.

If the despooler 305 determines in step 704 that the job attribute is not an AUTO attribute (NO in step 704), the entire job is printed under one setting (such as color, monochrome, simplex, or duplex printing). The process then proceeds to step 710. In step 710 (regenerate print command for intermediate job data), the despooler 305 thus does not perform special processing and regenerates a print command to print the page drawing data included in the intermediate job.

An example of how the color attribute is determined when combining a job in which color printing is designated with a job in which monochrome printing is designated will be described below.

Figure 19A:
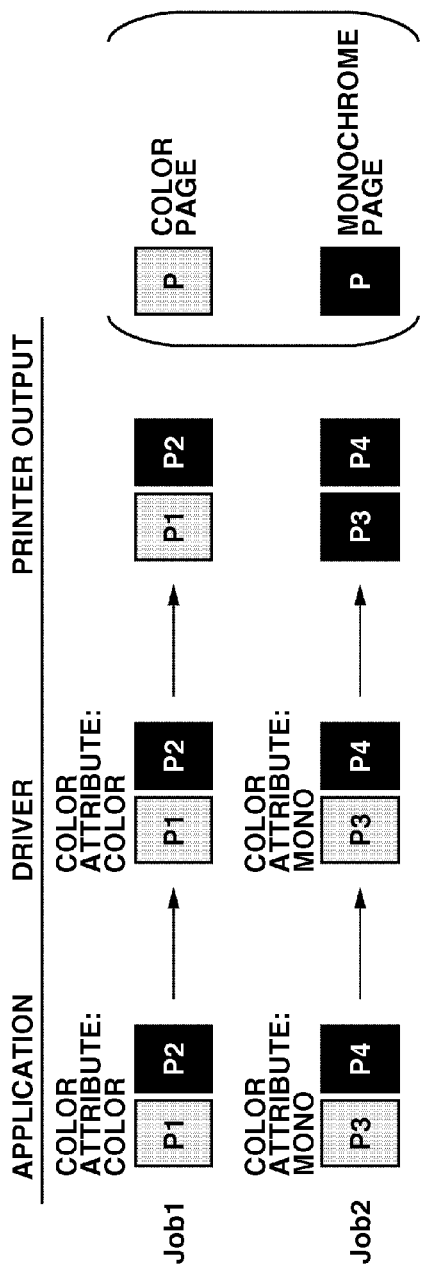
FIGS. 19A and 19B illustrate examples of a conventional operation performed when printing a color print job, a monochrome print job, and a combined job in which the color print job and the monochrome print job are combined.

FIG. 19A illustrates two intermediate jobs (i.e., Job 1 and Job 2). The job attribute of Job 1 designates color printing, and the job attribute of Job 2 designates monochrome printing. In both Job 1 and Job 2, the first page is a color page (i.e., a page including a color object) and the second page is a monochrome page (i.e., a page including only monochrome objects). Since the job attribute of Job 1 designates color printing, the color page is printed in color. The first page is thus printed in color, and the second page is printed in monochrome. On the other hand, since the job attribute of Job 2 designates monochrome printing, both the first and second pages are printed in monochrome.

When the above-described two intermediate jobs are combined, one setting value is re-assigned to the color attribute of the combined job.

Figure 19B:
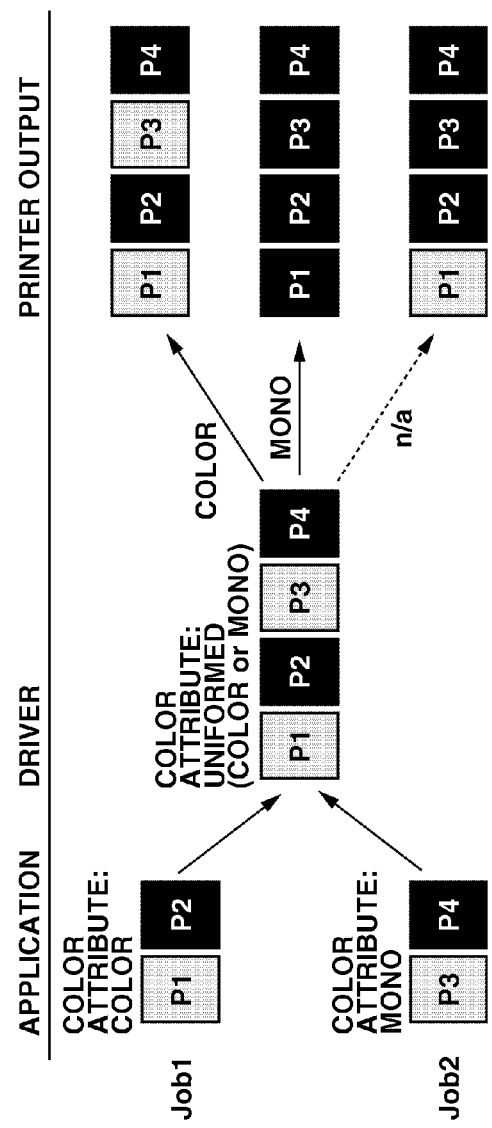

If color printing is then designated as the job attribute of the combined job as illustrated in FIG. 19B, the first page of Job 2 which is originally a color page is printed in color, so that the first page and third page are printed in color.

Further, if monochrome printing is designated as the job attribute of the combined job, all pages are monochrome printed. The output results of the above-described combined jobs are thus different from the result of separately printing each job (as illustrated in FIG. 19A).

Figure 10:
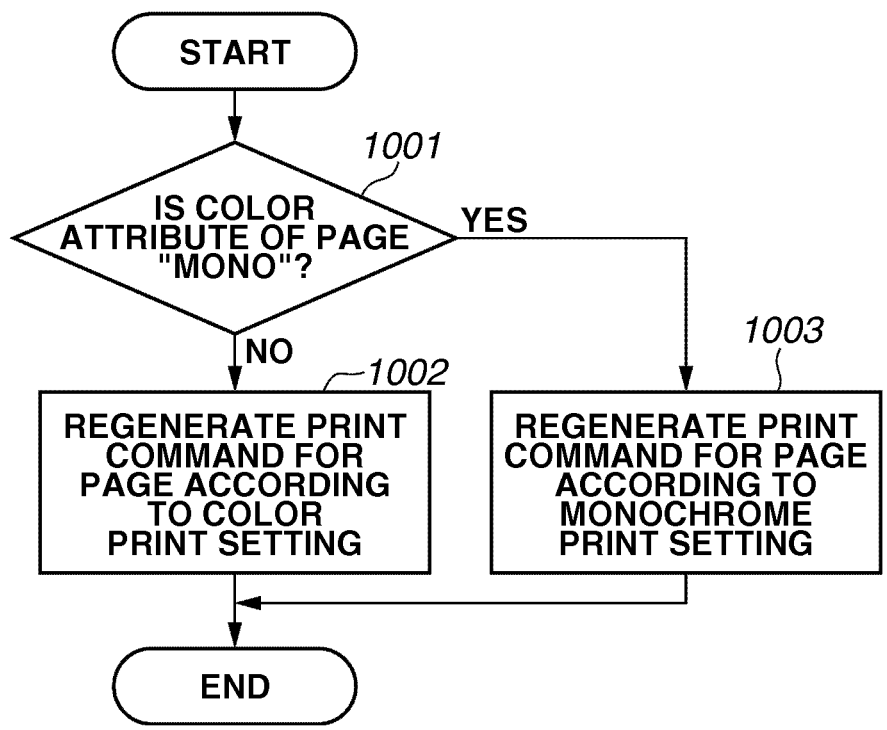
FIG. 10 is a flowchart illustrating color processing performed by the despooler.

A method of solving such difference in the output results will be described below with reference to FIG. 8 and FIG. 10.

Figure 8:
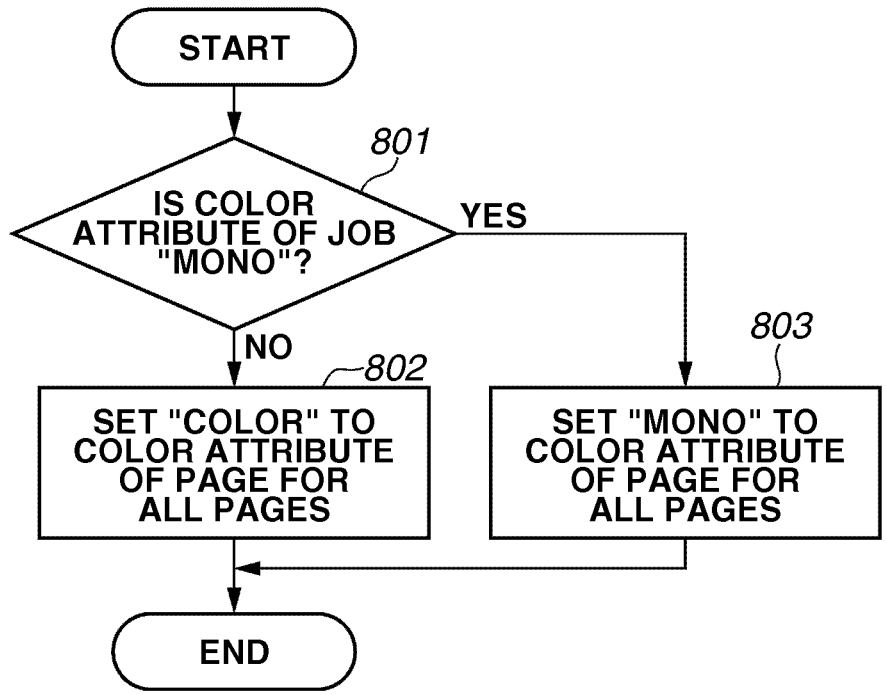
FIG. 8 is a flowchart illustrating color processing performed by the spooler.

FIG. 8 is a flowchart illustrating in detail the generation of the page attribute data when processing the color print job and the monochrome print job, i.e., the process of step 507 illustrated in FIG. 5.

The color attributes of the jobs received from the application are COLOR and MONO as illustrated in FIG. 21A.

In step 801, the spooler 302 determines whether the color attribute of the job is MONO. If the spooler 302 determines that the color attribute of the job is MONO (YES in step 801), the process proceeds to step 803. In step 803, the spooler 302 sets the color attribute of each of the pages in the job to MONO.

On the other hand, if the spooler 302 determines that the color attribute of the job is COLOR (NO in step 801), the process proceeds to step 802. In step 802, the spooler 302 sets the color attribute of each of the pages in the job to COLOR. By performing the above-described process on the two jobs illustrated in FIG. 19A, the attribute data illustrated in FIG. 21B is acquired.

Figure 9:
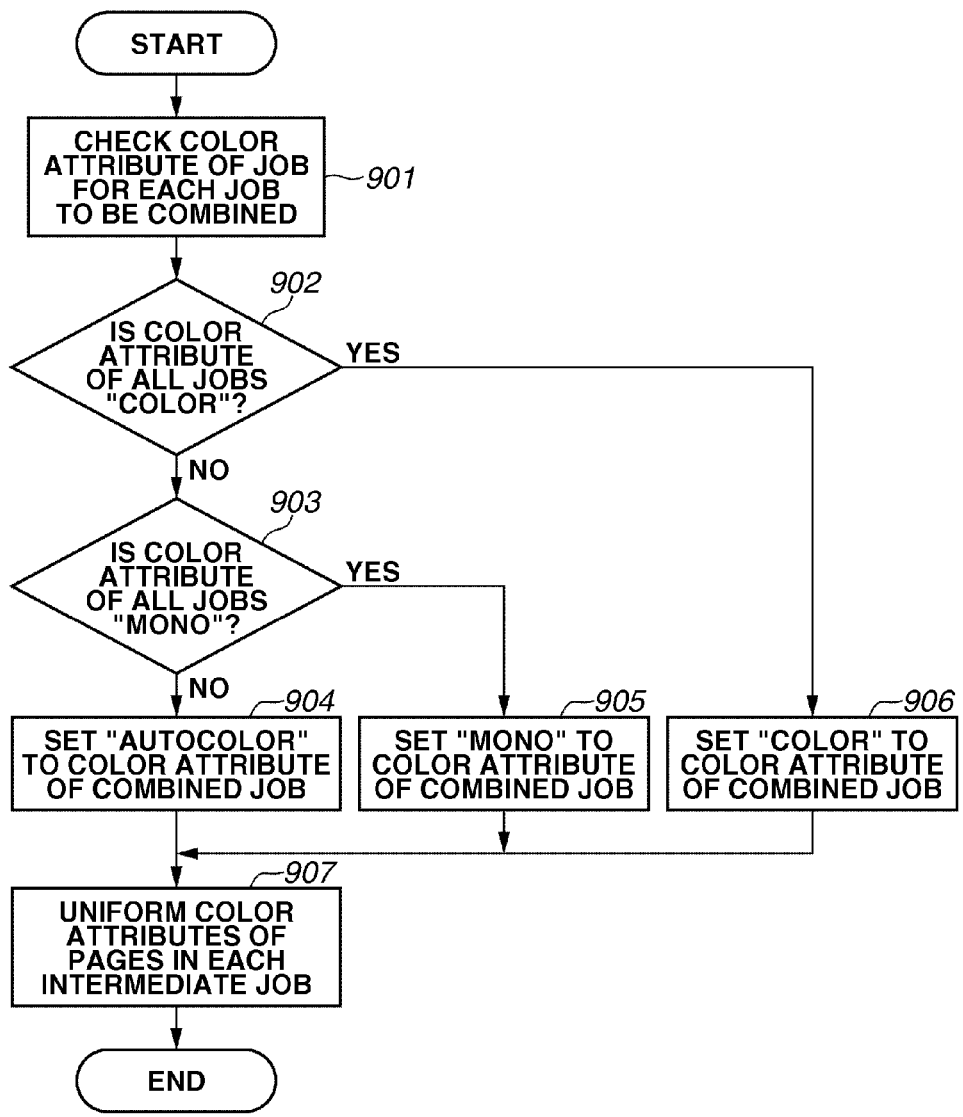
FIG. 9 is a flowchart illustrating color processing performed by the spool file manager.

FIG. 9 is a flowchart illustrating in detail the process of setting the uniform attribute when combining the color print job and the monochrome print job, i.e., the process of step 612 illustrated in FIG. 6.

In step 901, the spool file manager 304 checks the color attribute of each of the jobs to be combined. In step 902, the spool file manager 304 determines whether the color attributes of all jobs are COLOR. If the spool file manager 304 determines that the color attributes of all jobs are COLOR (YES in step 902), the process proceeds to step 906. In step 906, the spool file manager 304 sets COLOR to the color attribute of the combined job.

On the other hand, if the spool file manager 304 determines that the color attributes of all jobs are not COLOR (NO in step 902), the process proceeds to step 903. In step 903, the spool file manager 304 determines whether the color attributes of all jobs are MONO. If the spool file manager 304 determines that the color attributes of all jobs are MONO (YES in step 903), the process proceeds to step 905. In step 905, the spool file manager 304 sets MONO to the color attribute of the combined job.

If the spool file manager 304 determines that the color attributes of all jobs are not MONO (NO in step 903), the process proceeds to step 904. In step 904, the spool file manager 304 sets AUTOCOLOR to the color attribute of the combined job. In step 907, the spool file manager 304 uniforms the color attribute of each of the pages in each intermediate job.

In the case where the two jobs illustrated in FIG. 21B are combined, the attribute data illustrated in FIG. 21C is acquired by performing step 904 and step 907.

When the color attribute of the job is AUTOCOLOR, the process illustrated in FIG. 7 proceeds from the determination step of step 704 to step 707. FIG. 10 is a flowchart illustrating in detail the processing of the page drawing data according to the page attribute in performing a job in which COLOR and MONO attributes are mixed, i.e., the process of step 707.

In step 1001, the despooler 305 determines whether the color attribute of the page is MONO. If the despooler 305 determines that the color attribute of the page is MONO (YES in step 1001), the process proceeds to step 1003. In step 1003, the despooler 305 regenerates the print instruction for the page as a monochrome page (or regenerate print command for page according to monochrome print setting). On the other hand, if the despooler 305 determines that the color attribute of the page is COLOR (NO in step 1001), the process proceeds to step 1002. In step 1002, the despooler 305 regenerates the print instruction for printing the page as a color page (or regenerate print command for page according to color print setting).

In general, color printing or monochrome printing is designated by issuing a command. However, the color objects can be converted to monochrome objects to perform monochrome printing.

Figure 20:
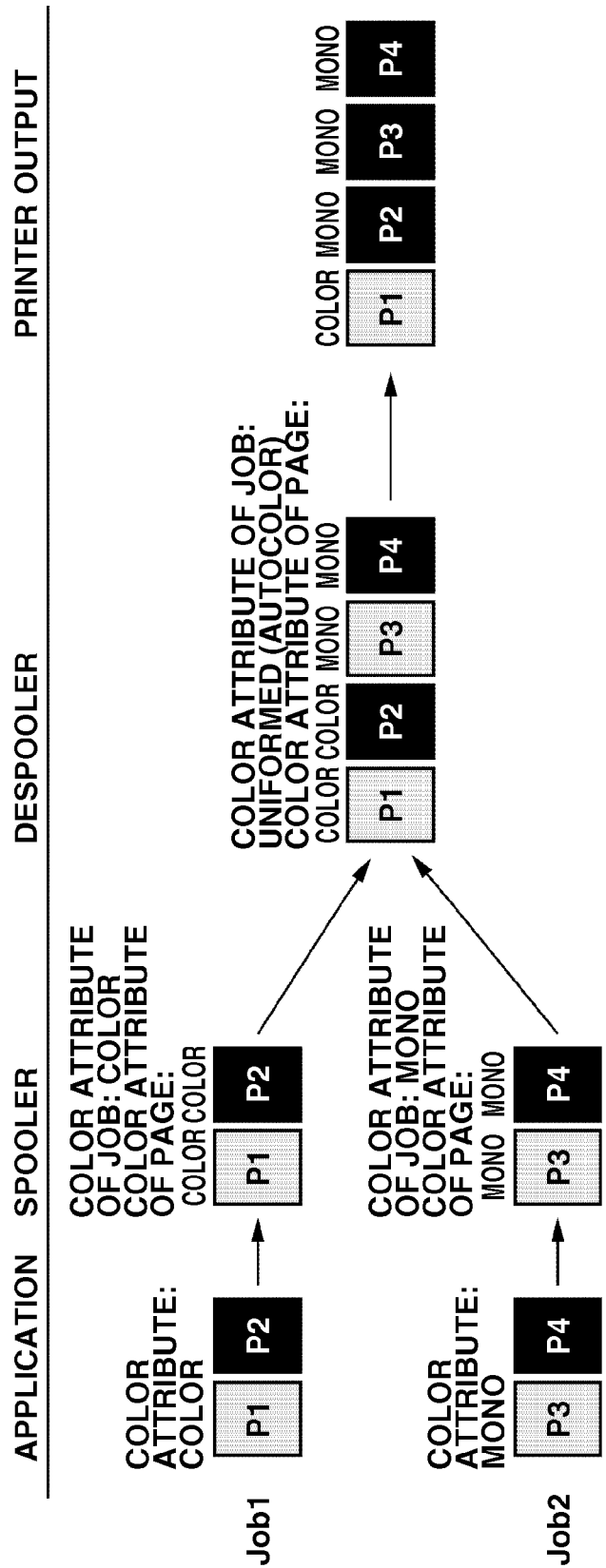
FIG. 20 illustrates an example of an operation performed when printing a combined job in which color and monochrome print jobs are combined according to the exemplary embodiment of the present invention.

As a result of performing the above-described process, the jobs in which different color settings are specified are output according to the respective setting even if the jobs are group-printed by combining the jobs. Such an output is illustrated in FIG. 20.

Figure 11:
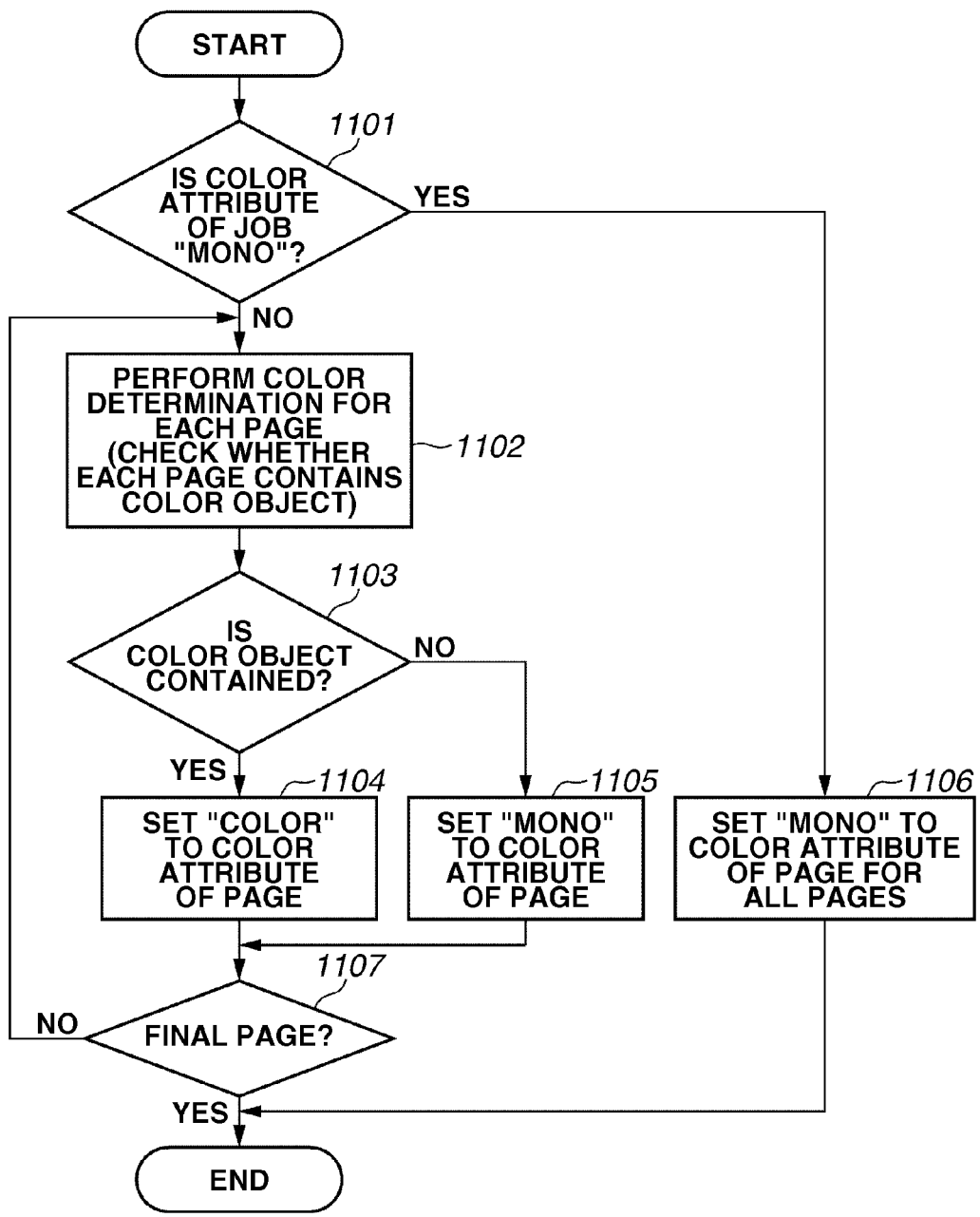
FIG. 11 is a flowchart illustrating color processing (including automatic color determination) performed by the spooler.

FIG. 11 is a flowchart illustrating in detail a process performed when color determination is added to the process illustrated in FIG. 8 in consideration of a fee charging process to be performed in the printer. The spooler 302 sets the color attribute for each page so that the monochrome page can be charged for fee as a monochrome page even when the color attribute of the job is specified as COLOR.

In step 1101, the spooler 302 determines whether the color attribute of the job is set to MONO. If the spooler 302 determines that the color attribute of the job is set to MONO (YES in step 1101), the process proceeds to step 1106. In step 1106, the spooler 302 sets the color attribute of the page to MONO for all pages.

On the other hand, if the spooler 302 determines that the color attribute of the job is not set to MONO (NO in step 1101), the process proceeds to step 1102. In step 1102 (perform color determination for each page (check whether each page contains color object)), the spooler 302 analyzes whether each page contains a color object.

If the spooler 302 determines that the page contains a color object (YES in step 1103), the process proceeds to step 1104. In step 1104, the spooler 302 sets the color attribute of the page to COLOR. If the spooler 302 determines that the page does not contain a color object (NO in step 1103), the process proceeds to step 1105. In step 1105 (set "mono" to color attribute of page), the spooler 302 sets the color attribute of the page to MONO.

The spooler 302 performs the processes of step 1102 to step 1105 for all pages in the job and determines whether the final page has been processed in step 1107. If the spooler 302 determines that the final page has been processed (YES in step 1107), the process ends. Otherwise, the process returns to step 1102.

For example, the color attribute data illustrated in FIG. 22A is generated when the above-described process is performed on the jobs illustrated FIG. 19A. The color attribute data illustrated in FIG. 22B is then generated when the spool file manager 304 combines the jobs.

The setting of the simplex/duplex printing attribute when combining a job in which a simplex printing attribute is set with a job in which a duplex printing attribute is set will be described below.

Figure 23:
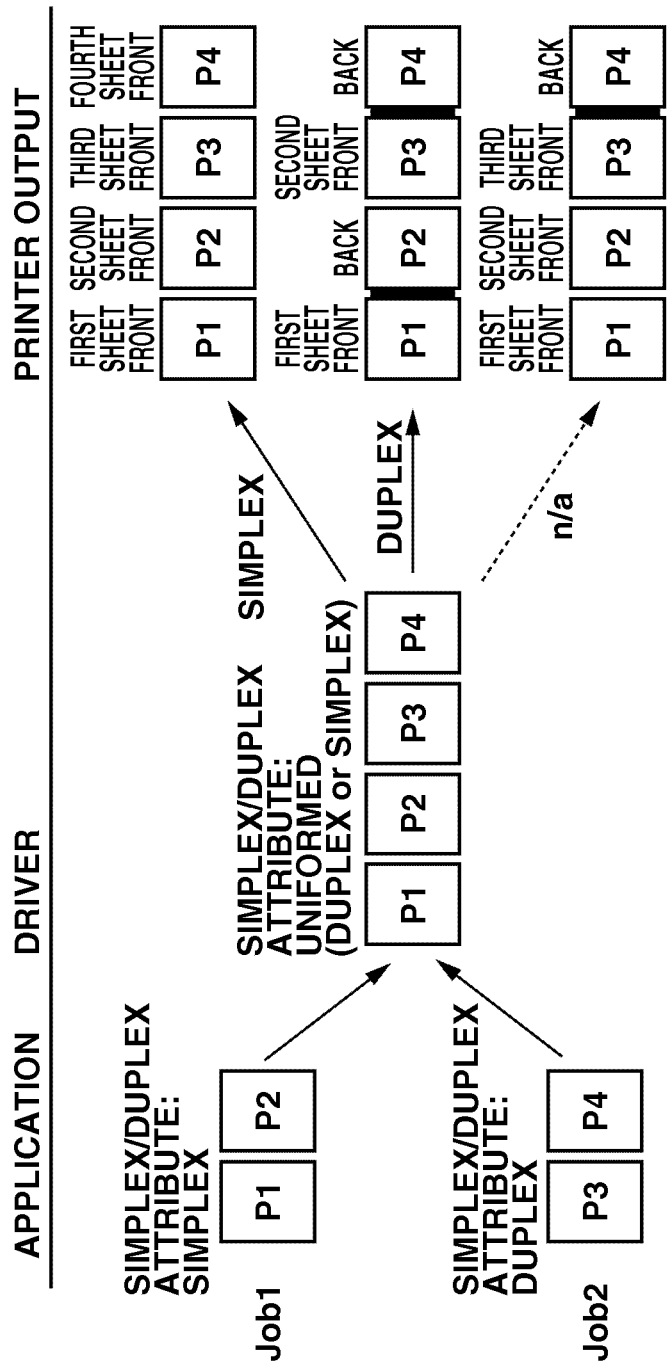
FIG. 23 illustrates an example of a conventional operation performed when printing a combined job in which a simplex printing job and a duplex printing job are combined.

FIG. 23 illustrates an example of combining a job in which a simplex printing attribute is designated (i.e., Job 1) with a job in which a duplex printing attribute is designated (i.e., Job 2). Since only one setting value can be specified to the simplex/duplex printing attribute of a job, either the simplex printing attribute or the duplex printing attribute is set to the combined job. As a result, the output desired by the user according to the original setting cannot be acquired when the jobs illustrated in FIG. 23 are combined.

A solution to such an issue will be described below.

FIG. 25A illustrates the simplex/duplex printing attribute of the job set to each of the jobs illustrated in FIG. 23.

Referring to FIG. 25A, the setting values are SIMPLEX (simplex printing) and DUPLEX (duplex printing).

The spooler 302 generates the simplex/duplex printing attribute data illustrated in FIG. 25B by performing the process illustrated in FIG. 5. The spool file manager 304 then generates the simplex/duplex printing attribute data of the combined job illustrated in FIG. 25C by performing the process illustrated in FIG. 6.

If the simplex/duplex printing attribute of the job is AUTO-DUPLEX, the despooler 305 performs the process of step 707 illustrated in FIG. 7 after performing the determination step of step 704.

Figure 12:
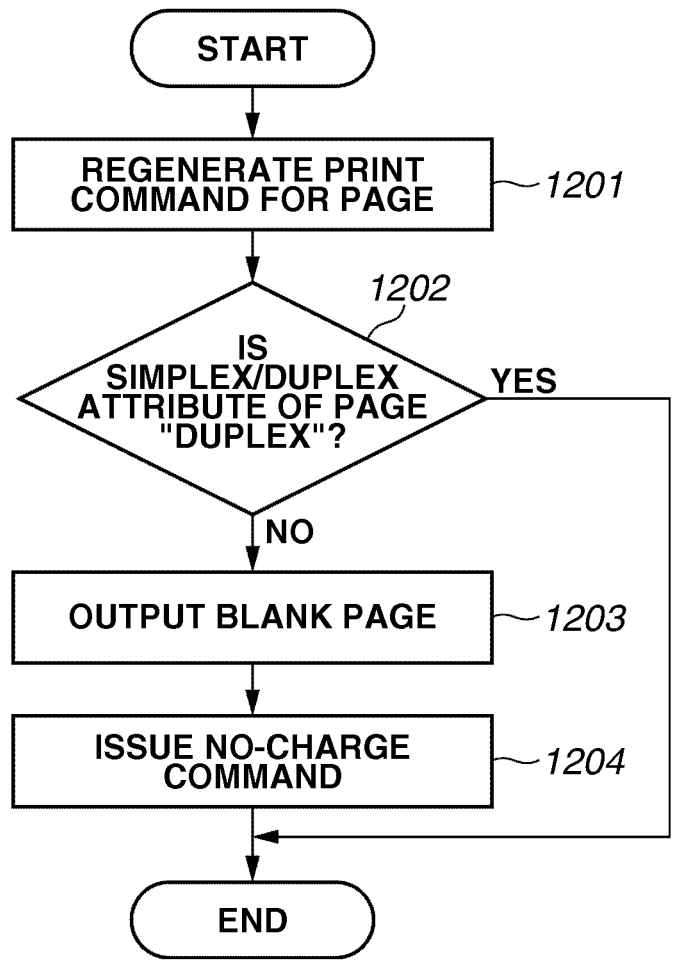
FIG. 12 is a flowchart illustrating processing of a simplex/duplex printing job performed by the despooler.

FIG. 12 is a flowchart illustrating in detail the processing of the page drawing data according to the page attribute i.e., the process of step 707 illustrated in FIG. 7, with respect to the simplex printing job and the duplex printing job. After the jobs are combined, the printer performs duplex printing for the entire job.

In step 1201, the despooler 305 regenerates the print instruction (or command) for the page.

In step 1202, the despooler 305 determines whether the simplex/duplex printing attribute of the page is DUPLEX. If the despooler 305 determines that the simplex/duplex printing attribute of the page is not DUPLEX (NO in step 1202), the process proceeds to step 1203. In step 1203, the despooler 305 inserts or outputs a blank page. In step 1204, the despooler 305 issues a blank page no-charge command in association with the blank page, so that the user is not charged for the blank page.

On the other hand, if the despooler 305 determines that the simplex/duplex printing attribute of the page is DUPLEX (YES in step 1202), the despooler 305 can normally transmit the print data. The process thus ends without further processing.

Figure 24:
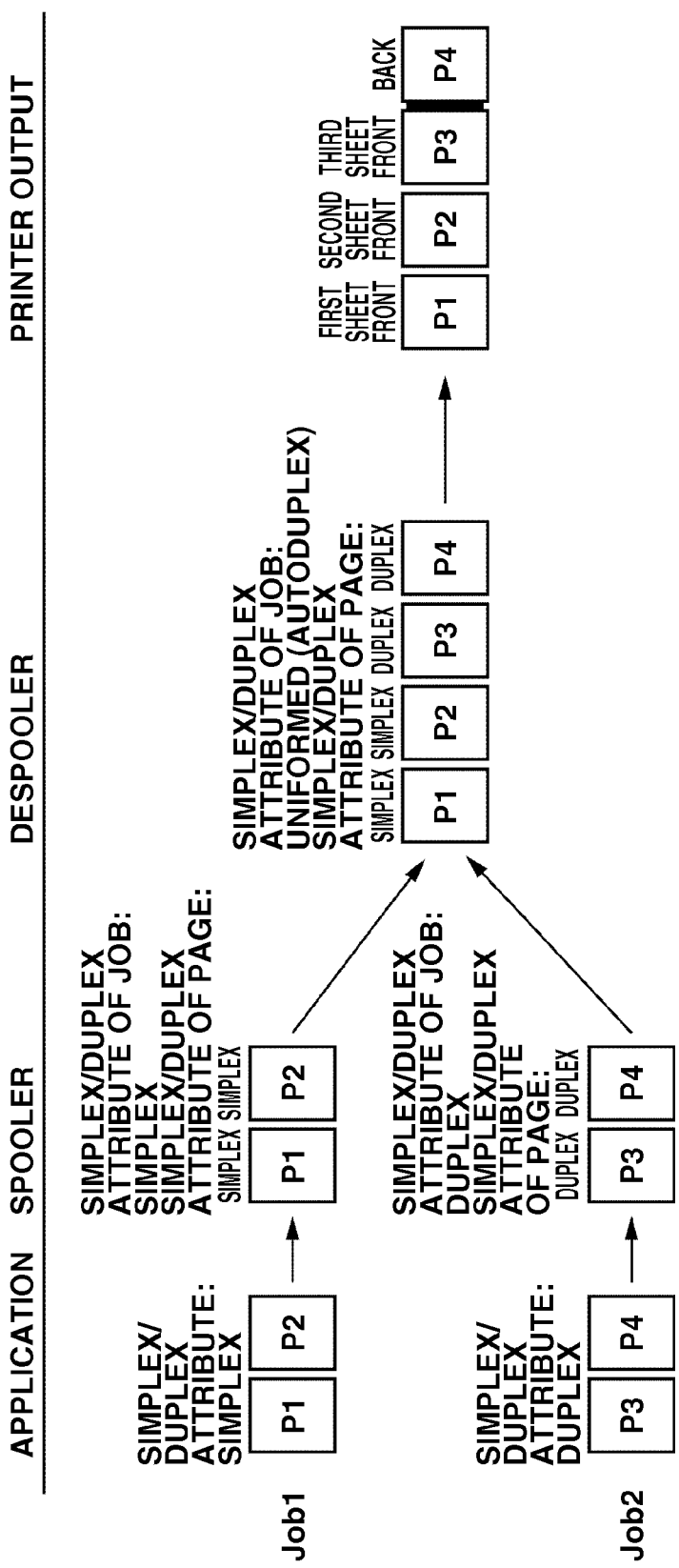
FIG. 24 illustrates an example of an operation performed when printing a combined job in which the simplex and the duplex printing jobs are combined according to the exemplary embodiment of the present invention.

As a result of performing the above-described process, the jobs illustrated in FIG. 24 in which the simplex printing attribute and the duplex printing attribute are each set can be output according to the respective settings even when the combined job is printed. Further, the combined job is printed without the user being charged for the inserted blank page.

The above-described examples assume that the user specifies the settings to each job. A process that integrates such user setting method with a control method for automatically determining the attributes according to the application name and the print content will be described below.

For example, a case where the color attribute of the job is determined according to the conditions illustrated in FIG. 26 is considered. Referring to FIG. 26, the application names "document" indicates a document creation application, "spreadsheet" a spreadsheet application, and "browse" a browser application.

Further, according to the conditions illustrated in FIG. 26, if the application name is "spreadsheet", the attribute setting value becomes monochrome (i.e., condition #1). If the application name is "browse", the color attribute setting value becomes color (i.e., condition #2), and if the application name is "document", the color attribute setting value generally becomes monochrome (i.e., condition #3). However, if a keyword "estimate" is contained in the document to be printed (i.e., condition #4), or if the job name is "Spec Document" (i.e., condition #5), the color attribute setting value becomes color.

FIG. 27 illustrates an example of a file which describes the conditions illustrated in FIG. 26. If the conditions of the application name (AppName), the job name (JobName), and the keyword (Keyword) are written in the file, a color mode (ColorMode) of the matching condition is set to the attribute of the job.

An example in which the attribute is set based on the application name will be described below. A similar process can also be performed based the objective of the application (such as document creation and spreadsheet).

Figure 13:
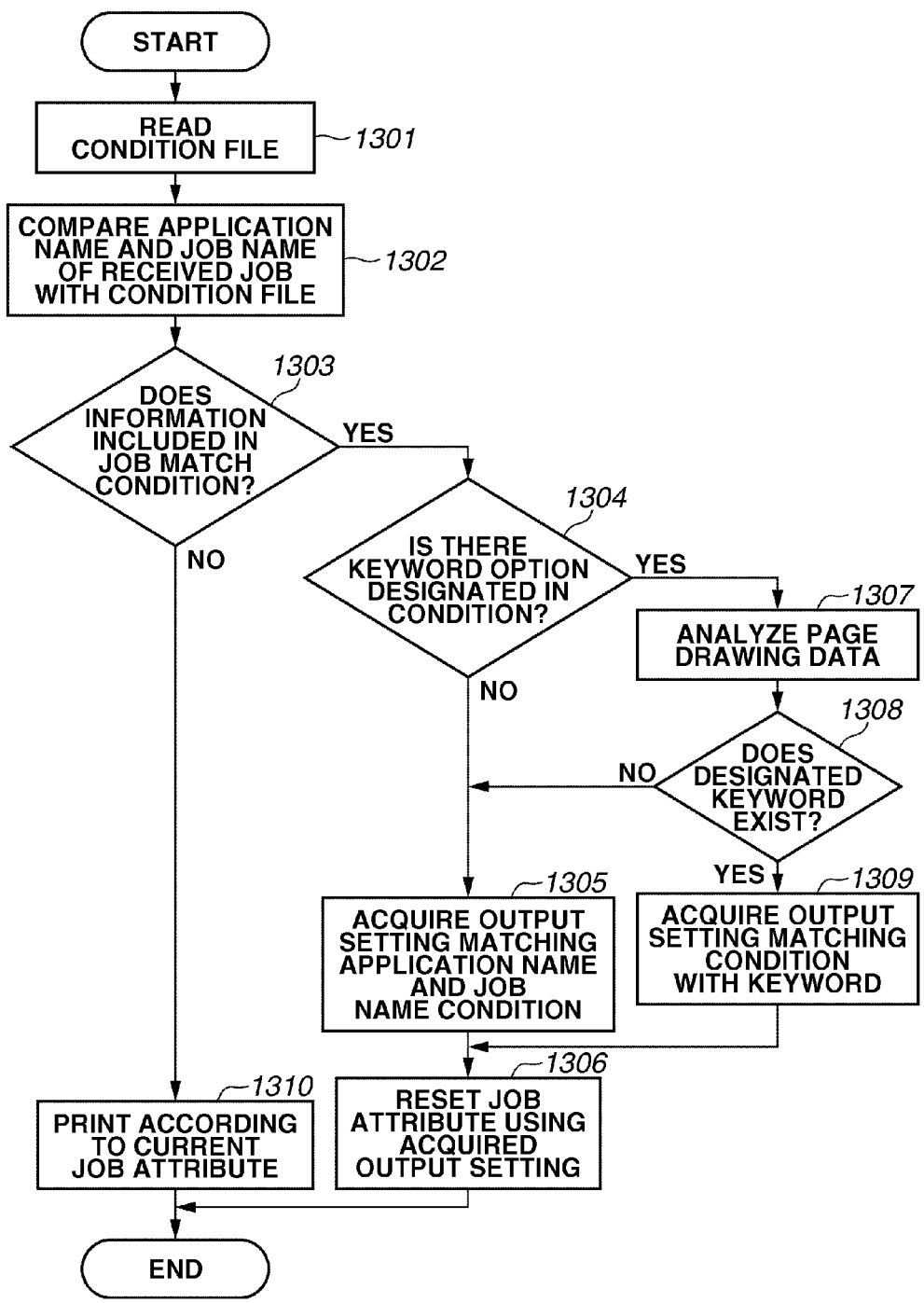
FIG. 13 is a flowchart illustrating a process for automatically determining a color attribute according to an application or a print content.

FIG. 13 is a flowchart illustrating in detail the above-described process of setting the attributes which is realized as part of the process performed in step 505 illustrated in FIG. 5.

In step 1301, the spooler 302 reads the file describing the conditions as illustrated in FIG. 27.

In step 1302, the spooler 302 acquires the application name and the job name of the received job and compares them with the conditions file. The application name and the job name can be acquired at the start of spooling. The application name can be determined by the name of the executed module, and the job name, which is freely generated by the application, usually uses the file name. Further, the job name can be searched by applying partial matching search, prefix search, and suffix search, in addition to perfect matching search.

In step 1303, the spooler 302 determines whether the information included in the job matches one of the conditions described in the conditions file. If the information does not match any of the conditions (NO in step 1303), the process proceeds to step 1310. In step 1310 (print according to current job attribute), the spooler does not change the attribute of the job, and the attribute value set in the application or the printer driver is used as the attribute of the job.

On the other hand, if the information matches one of the conditions (YES in step 1303), the process proceeds to step 1304. In step 1304, the spooler 302 further determines whether a keyword option is designated in the same condition. Referring to the example illustrated in FIG. 26, a job whose application name is "document" and whose job name is other than "Spec Document" matches the conditions #3 and #4. Since there is the keyword option in condition #4, a job including the keyword option "estimate" will be determined as "YES" in step 1304.

If the spooler determines that the keyword option is not designated (NO in step 1304), no other matching condition exists, and the process then proceeds to step 1305. In step 1305, the spooler 302 acquires the output setting allocated to the condition that matches the application name or the job name. In step 1306, the spooler 302 resets the job attribute of the present job using the acquired output setting.

On the other hand, if the spooler determines that the keyword option is designated (YES in step 1304), the process proceeds to step 1307. In step 1307, the spooler 302 analyzes the content of the page drawing data. In step 1308, the spooler 302 then determines whether the designated keyword exists in the page drawing data. If the spooler 302 determines that the designated keyword exists in the page drawing data (YES in step 1308), the process proceeds to step 1309. In step 1309, the spooler 302 acquires the output setting (i.e., attribute value) allocated to the condition. In step 1306, the spooler 302 then resets the job attribute of the present job using the acquired output setting.

If the spooler 302 determines that the designated keyword does not exist in the page drawing data (NO in step 1308), it is the same as matching a condition with no keyword option. The process thus proceeds to step 1305.

Figure 28:
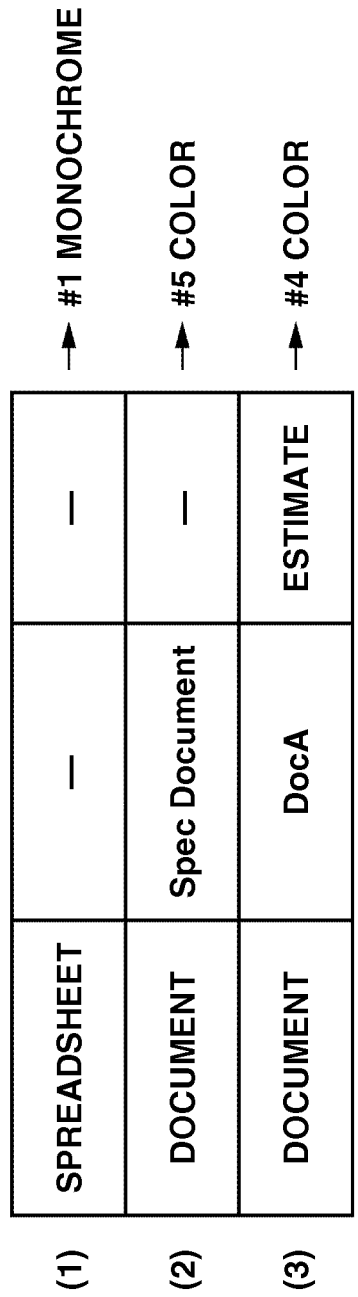
FIG. 28 illustrates an example of input data.

The process illustrated in FIG. 13 will be described below by referring to an example illustrated in FIG. 28. Referring to FIG. 28, three jobs are received respectively. In the case of job (1), it is determined in step 1303 that the job matches condition #1 illustrated in FIG. 26. Since it is determined in step 1304 that the keyword option does not exist, "monochrome" is set to the color attribute of job in step 1305. In the case of job (2), the job similarly matches condition #5, and "color" is set to the color attribute of the job. In the case of job (3), it is determined in step 1304 and then step 1308 that the job matches condition #4, and "color" is set to the color attribute of the job in step 1309.

Figure 29:
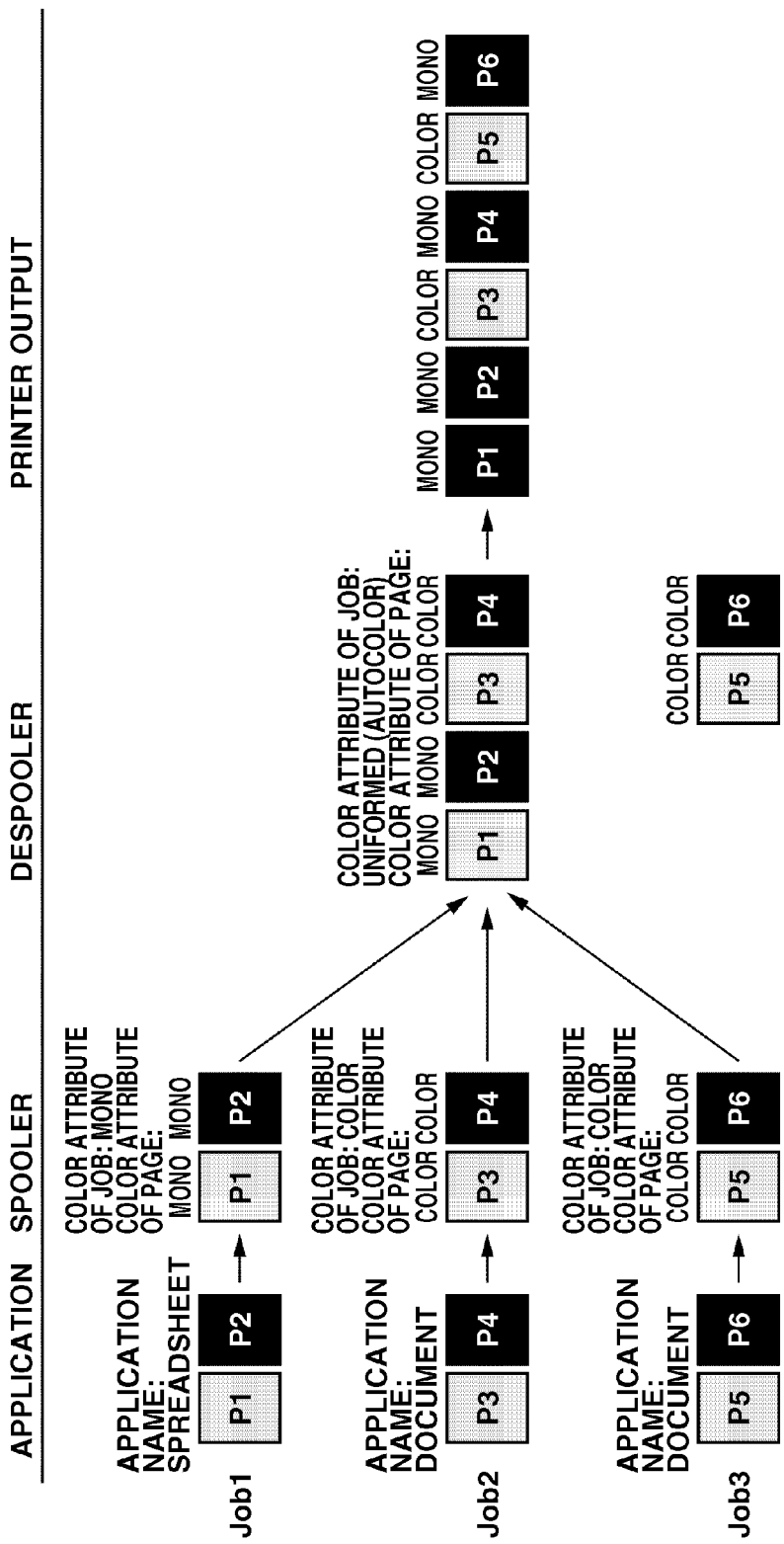
FIG. 29 illustrates an example of a process performed to determine the color attribute according to the application in the present invention.

FIG. 29 is a schematic diagram of applying the above-described process to the three jobs illustrated in FIG. 28. Referring to FIG. 29, the three jobs are once spooled and then collectively printed. The spooler 302 determines the job attribute of each job, the spool file manager 304 combines the jobs, and the despooler 305 prints according to the setting. In the example, the color attribute of the job is determined by the application name, which is an extended method for setting the attribute.

The system configuration of the second exemplary embodiment is similar to that of the first exemplary embodiment described in each of FIGS. 1, 2, 3, 4, 5, 6, and 7.

The second exemplary embodiment is different from the first exemplary embodiment in that the jobs to be combined are selected according to the output settings and combined instead of uniformly combining all of the spooled jobs. The print request to print a plurality of combined jobs is then issued to the despooler 305.

The present exemplary embodiment considers a job in which a special setting is specified. For example, a job which includes an instruction to store the print data in a box of the printer stores the data in the HDD of the printer instead of actually printing out the data. If the job is uniformly combined into one job with jobs including a job that prints out the data, the data is printed against the user intentions.

The second exemplary embodiment employs a control method for appropriately separating the jobs whose output methods are different even when the user requests collective printing without distinguishing the jobs. The jobs that are to be normally printed are thus combined and printed, and other jobs with a special output setting are output according to the setting.

Figure 30:
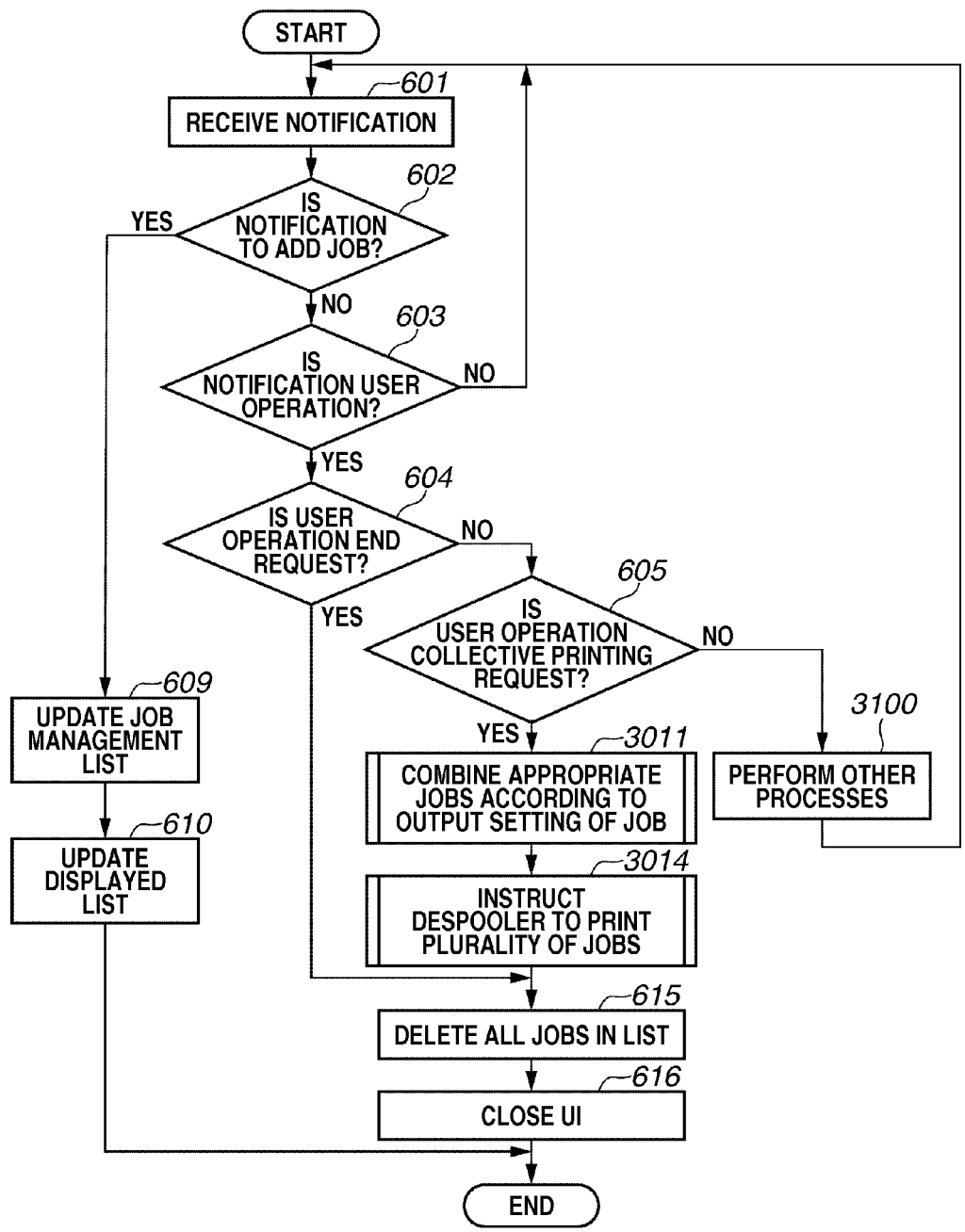
FIG. 30 is a flowchart illustrating exception processing performed in the spool file manager in which the jobs are not combined.

FIG. 30 is a flowchart illustrating in detail a process performed by the spool file manager 304 that mainly performs the control method according to the second exemplary embodiment. The steps similar to those illustrated in FIG. 6 are assigned the same reference numbers, and the difference from the process illustrated in FIG. 6 will be described below.

In step 605, the spool file manager 304 determines whether there is a request to perform collective printing. If the spool file manager 304 determines that there is a request to perform collective printing (YES in step 605), the process proceeds to step 3011. In step 3011, the spool file manager 304 checks the output settings of the jobs. If the spool file manager 304 determines that there is a job among the jobs which is to be independently output, the spool file manager 304 selects and combines only the jobs to be normally printed. The spool file manager 304 skips the combining process of the other jobs, or groups the jobs according to the output setting of each job and combines the jobs in each group.

In step 3014, the spool file manager 304 issues a print request to the despooler 305 to print one or more jobs that have been combined. An example of the process according to the output setting will be described below.

The processes performed in step 3100 and the subsequent steps are similar to the above-described processes. More specifically, the processes performed after the determination processes in step 606 to step 608 are also applied to the process of FIG. 30.

Examples of the special output setting include storing in the box, secure print, and priority printing. When storing in the box is specified, the print job (or the print data) is stored in the HDD of the printer. In secure print, the printing of the job received by the printer is stopped until the user inputs the password via the operation panel of the printer. In priority printing, priority is given to printing a specified job. As a result, it is unsuitable to combine such jobs with a job that performs normal printing. The combining process thus combines only the jobs that are to be normally printed out and does not include such jobs with special output settings.

Figure 31:
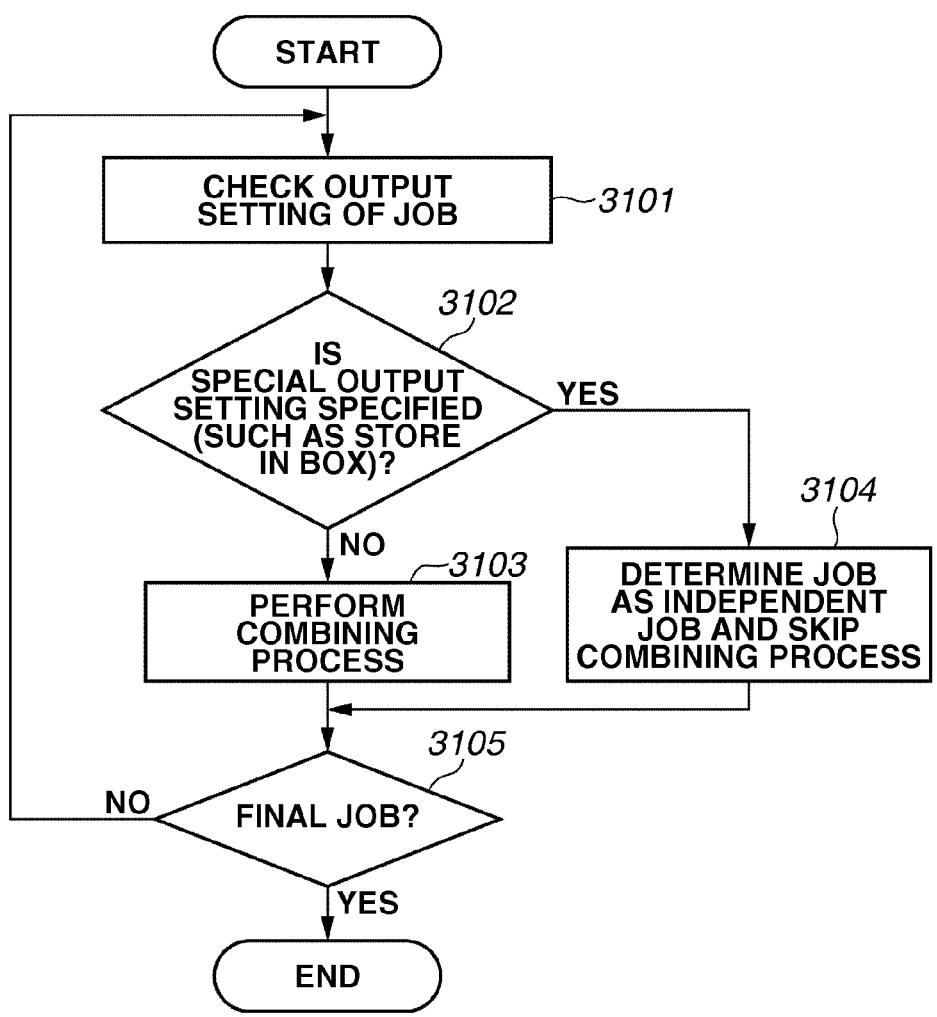
FIG. 31 is a flowchart illustrating exception processing performed when a special output setting is specified.

FIG. 31 is a flowchart illustrating in detail the process performed in step 3011 illustrated in FIG. 30.

In step 3101, the spool file manager 304 checks the output setting of the job.

In step 3102, the spool file manager 304 determines whether a special output setting is specified to the job. If the spool file manager 304 determines that the special output setting is specified to the job (YES in step 3102), the process proceeds to step 3104. In step 3104, the spool file manager 304 determines that the job is an independent job and skips the combining process. On the other hand, if the spool file manager 304 determines that a general output setting is specified to the job (NO in step 3102), the process proceeds to step 3103. In step 3103, the spool file manager 304 then combines the job with other jobs. More specifically, the spool file manager 304 combines the intermediate job files, combines the attribute data, and updates the job management list.

The spool file manager 304 then performs the processes of step 3101 to step 3104 for all spooled intermediate job files. In step 3105, if the spool file manager 304 determines that the final job is processed, the process ends. In the present process, intermediate jobs other than those that are specified the special output setting are sequentially combined. However, the intermediate job files to be combined can be collectively combined after analyzing all of the jobs.

Figure 32:
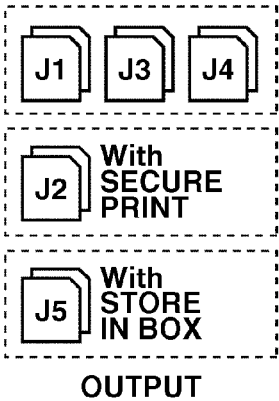
FIG. 32 illustrates an operation example when the exemplary embodiment is applied.

FIG. 32 illustrates an example of printing the jobs according to the present exemplary embodiment. Referring to FIG. 32, print requests are issued to print five jobs J1, J2, J3, J4, and J5. If secure print is specified to the job J2 and box storing is specified to the job J5, the process of step 3104 is performed on the jobs J2 and J5, and the process of step 3103 is performed on the rest of the jobs. As a result, three jobs are output.

Another example of the special output setting specified to a job is department management information (i.e., a billing code). It may not be desirable to combine the jobs in which different billing codes are set in terms of correctly summing up the printing performance of the printer. It may be thus necessary to combine the jobs according to the billing codes when the department management settings are specified.

In the present process, if the printing order of the jobs is not important (in particular, when the user has not previously set the order), the jobs are rearranged, and the jobs with the same billing codes are grouped and combined. In contrast, if the printing order is important, the billing codes are checked between successive jobs, and the jobs are combined if the billing codes are the same. By performing such control, the total number of jobs can be decreased, and a possibility of an unexpected interruption by another job can be reduced.

Figure 33:
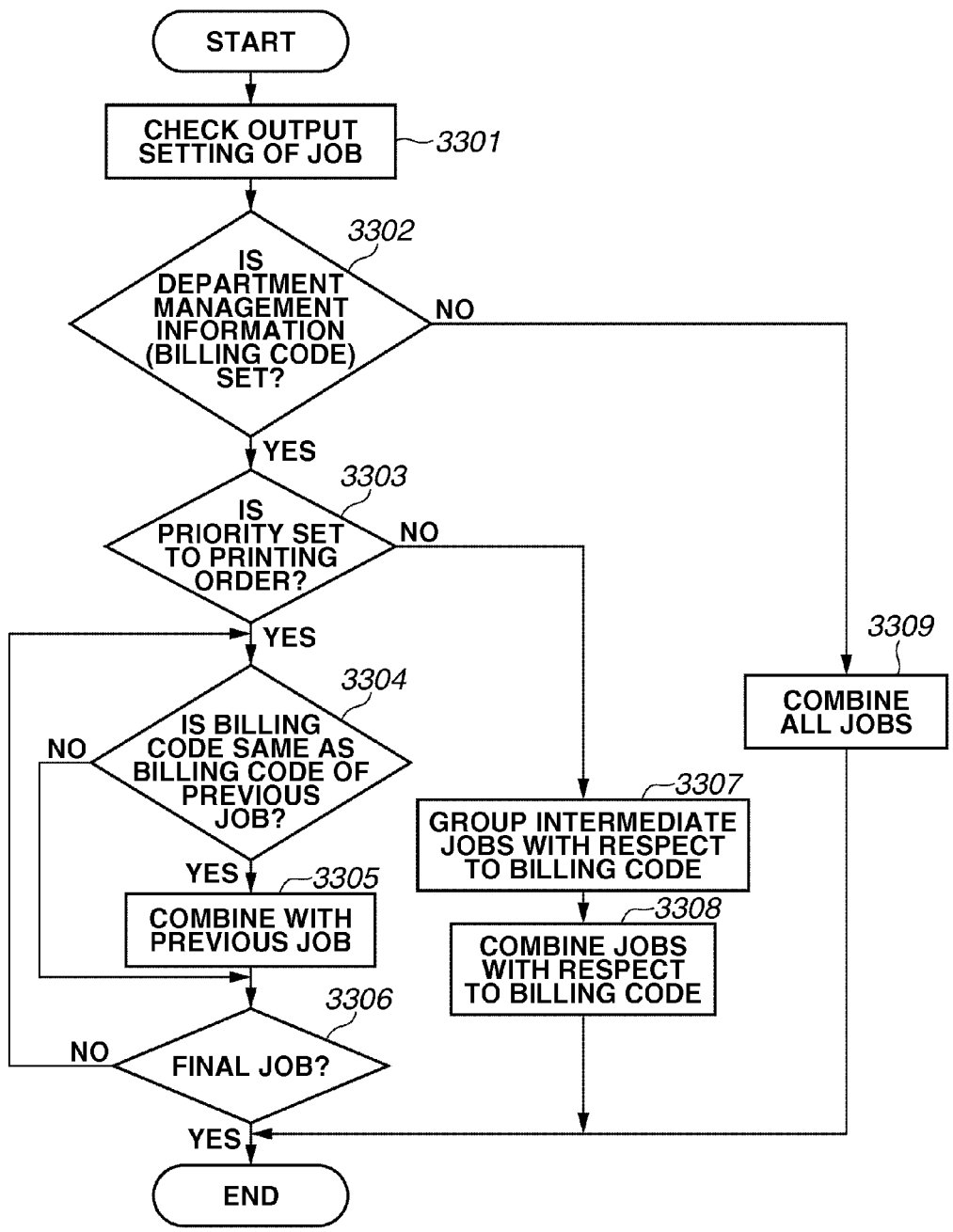
FIG. 33 is a flowchart illustrating exception processing performed when a department management setting is specified to a job.

FIG. 33 is a flowchart illustrating in detail the process performed in step 3011 illustrated in FIG. 30, which is characteristic of the present exemplary embodiment.

In step 3301, the spool file manager 304 checks the output setting of the job.

In step 3302 (is department management information (billing code) set?), the spool file manager 304 determines whether the setting or the environment of the present printing system includes the billing code. If the billing code is not included (NO in step 3302), the process proceeds to step 3309. In step 3309, the spool file manager 304 combines all of the intermediate job files. For example, the billing code is not set to the job in a printing environment that does not perform department management.

On the other hand, if the billing code is included (YES in step 3302), the process proceeds to step 3303. In step 3303, the spool file manager 304 determines whether to set priority to the printing order. In general, the print result is output in the order in which the user issues the print request. However, if the priority is not set to the printing order, priority can be set to the combining process so that a maximum number of jobs can be combined. In such a case, the user specifies a setting on the UI (not illustrated) to output the print result in the order of the print requests.

If it is determined that priority is set to the printing order (YES in step 3303), the process proceeds to step 3304. In step 3304, the spool file manager 304 determines whether the billing code of the second intermediate job file and the following intermediate job files is the same as that of previous intermediate job file. If the billing codes are the same (YES in step 3304), the process proceeds to step 3305. In step 3305, the spool file manager 304 combines the intermediate job file with the previous intermediate job file. On the other hand, if the billing code is not the same as that of the previous intermediate job file (NO in step 3304), the spool file manager 304 does not combine the intermediate job files.

The spool file manager 304 then performs the processes of step 3304 and step 3305 for all spooled intermediate job files. In step 3306, if the spool file manager 304 determines that the final job has been processed, the process ends.

In step 3303, if the spool file manager 304 determines that priority is not set to the printing order (NO in step 3303), the process proceeds to step 3307. In step 3307, the spool file manager 304 groups the intermediate files with respect to the billing codes set to the intermediate files. In step 3308, the spool file manager 304 then combines the jobs for each group with respect to the billing code.

The process of combining the intermediate job files in the preset exemplary embodiment is similar to that of the first exemplary embodiment.

Further, other examples of the special output setting are the finishing function including stapling and punching. If there is no function in the printer side that applies the above-described finishing setting to only a portion of the pages in a job, the process is collectively performed on one job. It is thus not appropriate to combine the print job in which such finishing setting is specified with a print job that has no such setting. In the present exemplary embodiment, a job to which the above-described special setting is specified is not combined with other jobs, and the combining process is performed on jobs to which other output settings are specified.

Figure 34:
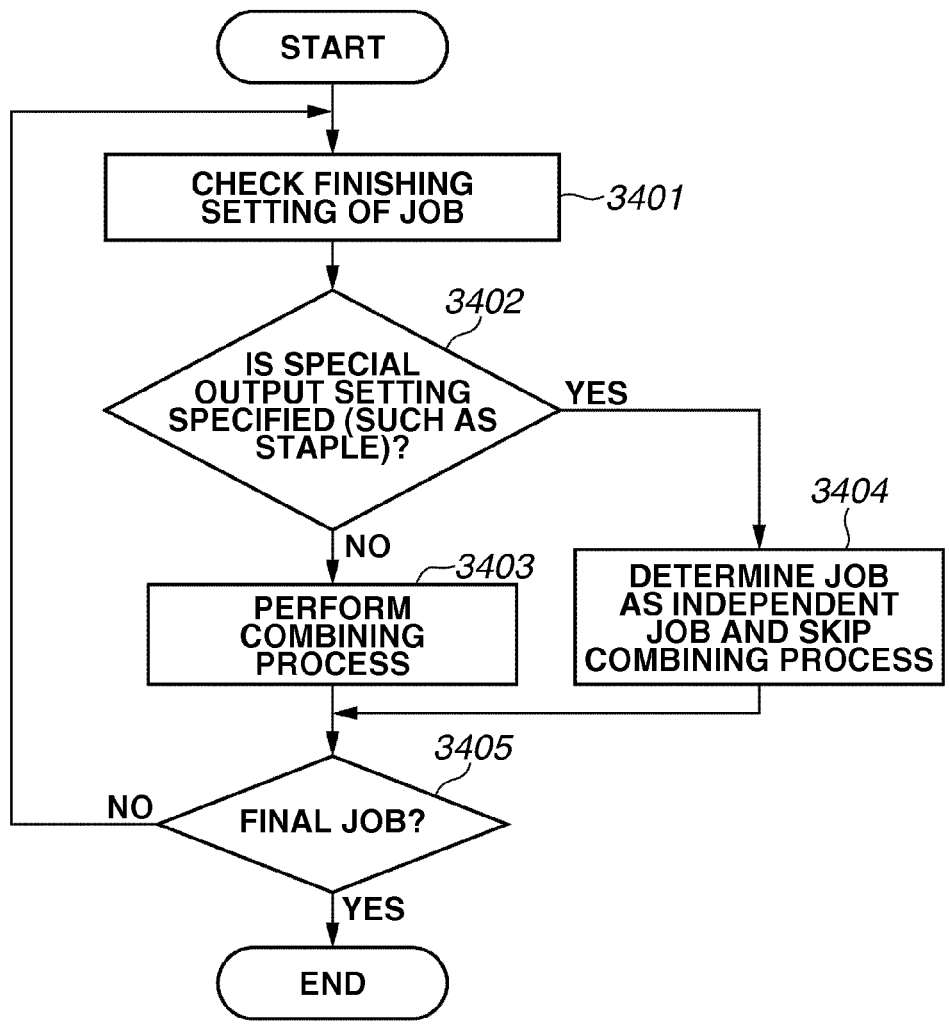
FIG. 34 is a flowchart illustrating exception processing performed when a special finishing setting is specified to a job.

FIG. 34 is a flowchart illustrating in detail the process performed in step 3011 illustrated in FIG. 30, which is characteristic of the present exemplary embodiment.

In step 3401, the spool file manager 304 checks the output setting of the job (or check finishing setting of job).

In step 3402, the spool file manager 304 determines whether there is a finishing setting specified to the job, such as stapling and punching. If the spool file manager 304 determines that the finishing setting is specified (YES in step 3402), the process proceeds to step 3404. In step 3404, the spool file manager 304 determines that the job is an independent job and skips the combining process.

On the other hand, if the spool file manager 304 determines that the finishing setting is not specified (NO in step 3402), the process proceeds to step 3403. In step 3403 (perform combining process), the spool file manager 304 combines the intermediate job files. Further, the spool file manager 304 combines the attribute data and updates the job management list.

The spool file manager 304 then performs the processes of step 3401 to step 3404 for all the spooled intermediate jobs. In step 3405, if the spool file manager 304 determines that the final job has been processed, the process ends. Otherwise, the process returns to step 3401.

Since the processes illustrated in the flowcharts of FIGS. 31, 32, 33, and 34 are performed on a plurality of jobs, an interrupt printing may be performed. A method for preventing interruption even for jobs which are not printed by combining the intermediate job files will be described below.

In the present method, the printer driver 203 performs the processes on all of the intermediate job files while the system spooler 204 is temporarily stopped. The output data generated by the printer driver 203 is then accumulated in the system spooler 204, and when the temporarily stopping of the system spooler 204 is cancelled, the output data is sequentially transmitted to the printer almost collectively.

Since the processing by the printer driver 203 is time-consuming, the data is transmitted to the printer via the system spooler 204 while the printer driver 203 is performing the process. As a result, the total processing time can be shortened as compared to transmitting the data after the printer driver 203 completes all of the processing.

However, if the jobs are transmitted after the printer driver 203 completes all of the processing, the interval between transmitting each job can be shortened. It then becomes less likely for the job to collide with a job transmitted from another client, and a possibility for the job to be interrupted by such job is reduced. Further, since binary data is continuously transmitted, the job may be determined as a continuous job depending on the network connection processing of the printer. This may be desirable for the job.

The above-described process can be realized by the despooler 305 temporarily stopping and then canceling the stopping of the system spooler 204.

To further reduce the probability of interruption, the order of transmitting the jobs is scheduled so that smaller jobs are transmitted first. If the size of the first job is small when two jobs are transmitted to the printer, the printer starts receiving the second job soon after the first job is received. As a result, the jobs will not be interrupted after the printer starts receiving the second job.

Figure 35:
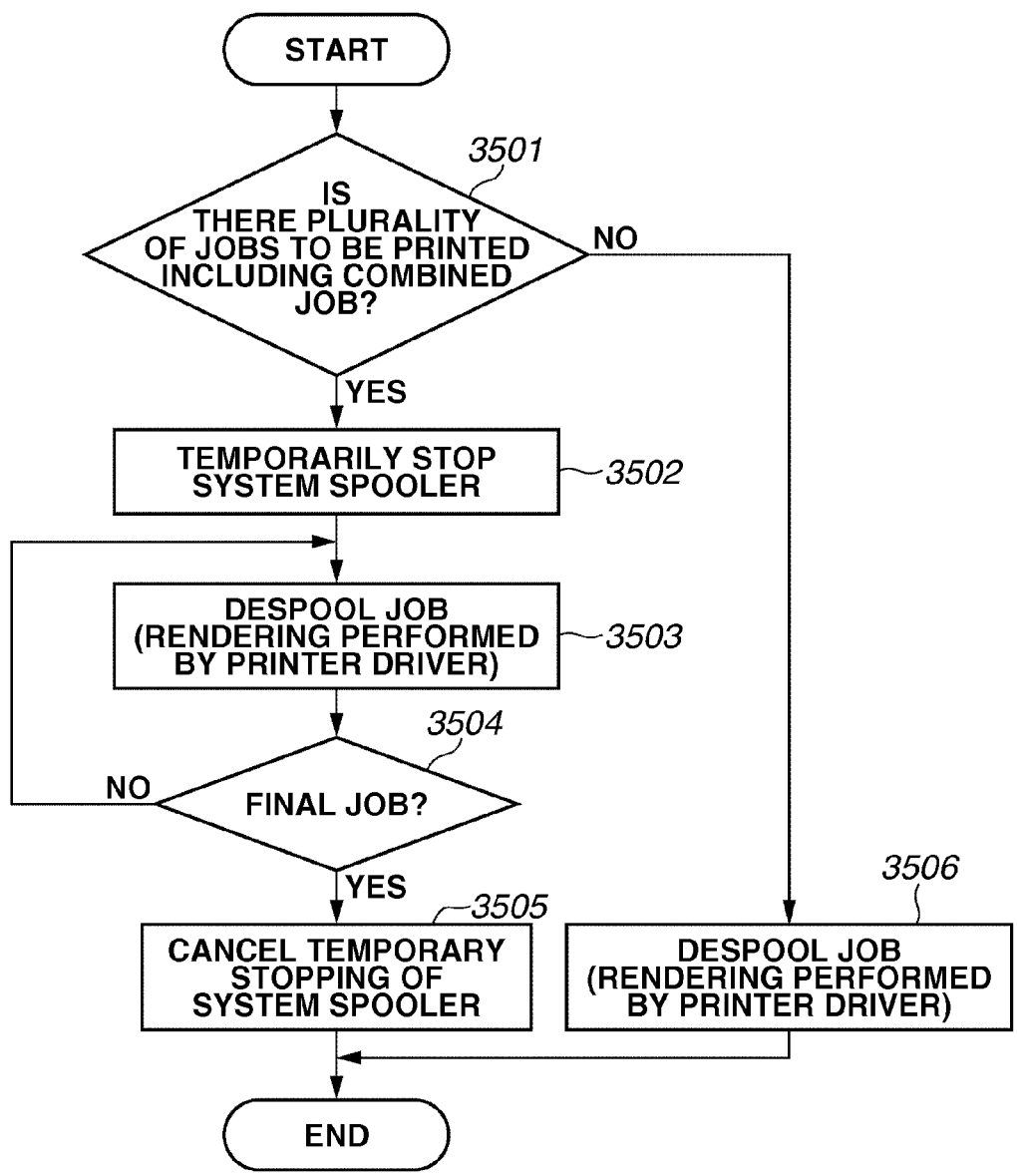
FIG. 35 is a flowchart illustrating a process of collectively transmitting a plurality of output jobs.

FIG. 35 is a flowchart illustrating in detail the process performed in step 3014 illustrated in FIG. 30, which is characteristic of the present exemplary embodiment.

In step 3501, the spool file manager 304 checks whether there is a plurality of jobs including the combined job to be printed. If there is only one job (NO in step 3501), the process proceeds to step 3506. In step 3506, the spool file manager 304 issues a print request to the despooler 305, and the process ends. On the other hand, if there is a plurality of jobs to be printed (NO in step 3501), the process proceeds to step 3502. In step 3502, the spool file manager 304 sends the request to the OS to temporarily stop the system spooler 204.

In step 3503, the spool file manager 304 issues a print request to the despooler 305. The printer driver 203 then performs rendering, and the output job which has been rendered (i.e., printer control command) is transmitted to the system spooler 204. Since the system spooler 204 is temporarily stopped, the output job is temporarily stored.

The spool file manger 304 then performs the process of step 3503 on all of the jobs to be printed. In step 3504, if the spool file manager 304 determines that the final job has been processed (YES in step 3504), the process proceeds to step 3505. In step 3505, the spool file manager 304 cancels the temporary stopping of the system spooler 204. As a result, the plurality of output jobs stored in the system spooler 204 is collectively transmitted to the printer. On the other hand, if the spool file manager 304 determines that the job is not the final job (NO in step 3504), the process returns to step 3503.

According to the second exemplary embodiment, the user can spool a plurality of print jobs even when special output settings are specified. The user then instructs "collective printing", and the present control method appropriately combines the jobs and automatically suppresses the interruption in the printer. The jobs are thus output on the printer. As a result, it becomes unnecessary for the user to select and spool the jobs to be collectively printed by considering the settings of the job. Further, the above-described output method can be employed even when a plurality of jobs are not combined, so that the jobs can be collectively output to the printer with the least possibility of interruption.

As described above, according to an exemplary embodiment of the present invention, a plurality of jobs is combined into one job before being transmitted to the printing apparatus. As a result, the printing order desired by the user can be maintained, and interruption by other jobs can be prevented, and a flexible configuration can be provided as described below.

More specifically, the job attribute and the page attribute of each page in the job of the combined job are set, so that printing is performed according to the job attributes of each of the jobs before combining, as desired by the user. This is realized even when only one job attribute value (print setting value) can be set to the combined job.

The color attribute and the simple/duplex printing attribute are attributes in which only one attribute value can be set to one job. Further, the exemplary embodiments of the present invention perform printing control using the job combining process in various print settings while maintaining the output desired by the user. The various print settings include finishing such as stapling and bookbinding printing, department management, and secure print.

Moreover, since the jobs are combined in the host computer side, it is not necessary to change the design of the printer to prevent interruption. As a result, the above-described configuration can realize low-cost and flexible printing control.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
a storing unit configured to store a plurality of jobs which are converted to an intermediate code format based on data to be printed generated by an application, in association with a job attribute to be set for each of the plurality of jobs;
an allocation unit configured to allocate a value of page attribute to each page included in a job of the plurality of jobs according to a specific job attribute in which only one attribute value can be allocated to one job as the set job attribute;
an instruction unit configured to issue an instruction to combine the plurality of jobs stored in the storing unit into one combined job;
a generation unit configured to generate, when the instruction unit issues the instruction to combine into one job the plurality of jobs whose specific job attributes are allocated different attribute values, a combined job so that printing is performed according to the allocated value of page attribute; and
a transmission unit configured to transmit the generated combined job as print data to a printing apparatus,
wherein the specific job attribute is a simplex/duplex printing attribute, wherein the allocation unit allocates, when a value of the simplex/duplex printing attribute set to the job is a simplex setting, a simplex setting as a value of page attribute to each page included in the job, and
wherein the allocation unit allocates, when a value of the simplex/duplex printing attribute set to the job is a duplex setting, a duplex setting as a value of page attribute to each page included in the job.

2. The apparatus according to claim 1, wherein the allocation unit allocates a value of page attribute to each page of the job according to at least one of information about the application, a keyword included in the printed data transmitted to the printing apparatus, and name of a job corresponding to the printed data transmitted to the printing apparatus.

3. The apparatus according to claim 1, further comprising a determination unit configured to analyze, when combining jobs based on the instruction, output settings of the plurality of jobs and to determine whether the plurality of jobs can be combined,
wherein the generation unit generates a combined job if the determination unit determines the plurality of jobs can be combined.

4. A method comprising:
storing, in a storing unit, a plurality of jobs which are converted to an intermediate code format based on data to be printed generated by an application, in association with a job attribute to be set for each of the plurality of jobs;
allocating a value of page attribute to each page included in a job of the plurality of jobs according to a specific job attribute in which only one attribute value can be allocated to one job as the set job attribute;
issuing an instruction to combine the plurality of jobs stored in the storing unit into one combined job;
generating, when the issuing issues the instruction to combine into one job the plurality of jobs whose specific job attributes are allocated different attribute values, a combined job so that printing is performed according to the allocated value of page attribute; and
transmitting the generated combined job as print data to a printing apparatus,
wherein the specific job attribute is a simplex/duplex printing attribute, wherein the allocation unit allocates, when a value of the simplex/duplex printing attribute set to the job is a simplex setting, a simplex setting as a value of page attribute to each page included in the job, and wherein the allocating allocates, when a value of the simplex/duplex printing attribute set to the job is a duplex setting, a duplex setting as a value of page attribute to each page included in the job.

5. The method according to claim 4, wherein the allocating includes allocating a value of page attribute to each page of the job according to at least one of information about the application, a keyword included in the printed data transmitted to the printing apparatus, and name of a job corresponding to the printed data transmitted to the printing apparatus.

6. The method according to claim 4, further comprising:
analyzing, when combining jobs based on the instruction, output settings of the plurality of jobs and to determine whether the plurality of jobs can be combined; and
generating a combined job if it is determined that the plurality of jobs can be combined.

7. A non-transitory computer readable medium storing a computer-executable program of instructions for causing a computer to perform a method comprising:
storing, in a storing unit, a plurality of jobs which are converted to an intermediate code format based on data to be printed generated by an application, in association with a job attribute to be set for each of the plurality of jobs;
allocating a value of page attribute to each page included in a job of the plurality of jobs according to a specific job attribute in which only one attribute value can be allocated to one job as the set job attribute;
issuing an instruction to combine the plurality of jobs stored in the storing unit into one combined job;
generating, when the issuing issues the instruction to combine into one job the plurality of jobs whose specific job attributes are allocated different attribute values, a combined job so that printing is performed according to the allocated value of page attribute; and
transmitting the generated combined job as print data to a printing apparatus,
wherein the specific job attribute is a simplex/duplex printing attribute, wherein the allocation unit allocates, when a value of the simplex/duplex printing attribute set to the job is a simplex setting, a simplex setting as a value of page attribute to each page included in the job, and
wherein the allocating allocates, when a value of the simplex/duplex printing attribute set to the job is a duplex setting, a duplex setting as a value of page attribute to each page included in the job.

8. The non-transitory computer readable medium according to claim 7, wherein the allocating includes allocating a value of page attribute to each page of the job according to at least one of information about the application, a keyword included in the printed data transmitted to the printing apparatus, and name of a job corresponding to the printed data transmitted to the printing apparatus.

9. The non-transitory computer readable medium according to claim 7, further comprising:
analyzing, when combining jobs based on the instruction, output settings of the plurality of jobs and to determine whether the plurality of jobs can be combined; and
generating a combined job if it is determined that the plurality of jobs can be combined.

* * * * *